(12) United States Patent
Sakurai et al.

(10) Patent No.: US 8,592,035 B2
(45) Date of Patent: Nov. 26, 2013

(54) ADHESIVE COMPOSITION, ADHESIVE TAPE AND ADHESION STRUCTURE

(75) Inventors: Aizoh Sakurai, Tokyo (JP); Eiji Mizuno, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 1042 days.

(21) Appl. No.: 11/721,551

(22) PCT Filed: Nov. 14, 2005

(86) PCT No.: PCT/US2005/040783
§ 371 (c)(1),
(2), (4) Date: Jan. 23, 2008

(87) PCT Pub. No.: WO2006/065410
PCT Pub. Date: Jun. 22, 2006

(65) Prior Publication Data
US 2008/0311332 A1   Dec. 18, 2008

(30) Foreign Application Priority Data

Dec. 13, 2004   (JP) ................................. 2004-360228

(51) Int. Cl.
| | | |
|---|---|---|
| *B32B 7/06* | (2006.01) | |
| *B32B 7/12* | (2006.01) | |
| *C08L 33/10* | (2006.01) | |
| *C08L 39/00* | (2006.01) | |
| *C08L 53/00* | (2006.01) | |
| *C08L 53/02* | (2006.01) | |

(52) U.S. Cl.
USPC ............... 428/355 EN; 428/343; 428/355 R; 428/355 BL; 428/355 CN; 525/71; 525/77; 525/90; 525/98

(58) Field of Classification Search
None
See application file for complete search history.

(56) References Cited

U.S. PATENT DOCUMENTS

| | | | | |
|---|---|---|---|---|
| 5,143,972 | A | * | 9/1992 | Groves ............................ 525/71 |
| 5,403,658 | A | | 4/1995 | Southwick et al. |
| 5,602,202 | A | * | 2/1997 | Groves ............................ 525/73 |
| 5,677,376 | A | * | 10/1997 | Groves ............................ 525/73 |
| 6,162,868 | A | | 12/2000 | Radigon et al. |
| 6,231,962 | B1 | * | 5/2001 | Bries et al. ................. 428/317.3 |
| 6,383,653 | B1 | | 5/2002 | Vaidya |
| 6,497,949 | B1 | | 12/2002 | Hyde et al. |

(Continued)

FOREIGN PATENT DOCUMENTS

| | | |
|---|---|---|
| DE | 3331016 A1 | 10/1984 |
| DE | 10063018 A1 | 7/2002 |

(Continued)

OTHER PUBLICATIONS

Translation of JP 08-311414 A, Nov. 1996.*

(Continued)

*Primary Examiner* — David Sample
*Assistant Examiner* — Jeff Vonch
(74) *Attorney, Agent, or Firm* — David B. Patchett

(57) ABSTRACT

To provide a pressure-sensitive adhesive composition for a removable pressure-sensitive adhesive tape which can be, after attaching to an adherend, easily removed from the adherend by stretching the pressure-sensitive adhesive tape and does not cause adhesive transfer on the adherend or damage of the adherend. A pressure-sensitive adhesive composition comprises a cohesive component comprising a styrene-based block copolymer, and a basic component.

13 Claims, 2 Drawing Sheets

(56) References Cited

U.S. PATENT DOCUMENTS

| | | | |
|---|---|---|---|
| 6,503,621 B1 * | 1/2003 | Ma et al. | 428/355 BL |
| 6,608,143 B1 | 8/2003 | Fukuoka et al. | |
| 6,723,407 B2 * | 4/2004 | Dollase et al. | 428/40.1 |
| 7,744,998 B2 * | 6/2010 | Nakamuta | 428/355 CN |
| 2002/0193724 A1 * | 12/2002 | Stebbings et al. | 602/54 |
| 2004/0265529 A1 * | 12/2004 | Luhmann et al. | 428/40.1 |
| 2007/0077418 A1 * | 4/2007 | Sakurai et al. | 428/343 |

FOREIGN PATENT DOCUMENTS

| | | | |
|---|---|---|---|
| JP | 59-75975 | 4/1984 | |
| JP | 6-504077 | 5/1984 | |
| JP | 01178575 A * | 7/1989 | C09J 7/02 |
| JP | 7-258610 | 10/1995 | |
| JP | 8-311414 | 11/1996 | |
| JP | 08311414 A * | 11/1996 | C09J 7/02 |
| JP | 9-502213 | 3/1997 | |
| JP | 2000-38555 | 2/2000 | |
| JP | 2000-351952 | 12/2000 | |
| JP | 2002-167558 | 6/2002 | |
| WO | WO 95/19393 | 7/1995 | |
| WO | WO 96/25469 | 8/1996 | |
| WO | WO 97/00914 | 1/1997 | |
| WO | WO 97/00922 | 1/1997 | |
| WO | WO 01/59025 A1 | 8/2001 | |
| WO | WO 02/14448 | 2/2002 | |

OTHER PUBLICATIONS

"Adhesion and Adhesives Technology: An Introduction", Munich: Hanser, 1997. p. 218. Print. (1 page).

"DuPont Surlyn Resins for Polymer Modification", http://www2.dupont.com/Surlyn/en_US/uses_apps/polymer_modifiers.html (2 Pages).

"Kraton FG-1901X Styrene Ethylene Butylene Styrene Block Copolymer", *IDES—The Plastics Web*, www.ides.com, Last Updated: Nov. 30, 2005 (1 page).

* cited by examiner

ADHESIVE COMPOSITION, ADHESIVE TAPE AND ADHESION STRUCTURE

The present invention relates to a pressure-sensitive adhesive composition and a pressure-sensitive adhesive tape. More specifically, the present invention relates to a removable pressure-sensitive adhesive tape which can be, after attaching to an adherend, easily removed from the adherend by stretching the pressure-sensitive adhesive tape and causes no adhesive transfer on the adherend, and also relates to a pressure-sensitive adhesive composition suitably used for the above-described pressure-sensitive adhesive tape. Furthermore, the present invention relates to an adhesion structure equipped with the pressure-sensitive adhesive tape of the present invention.

Hitherto, so-called pressure-sensitive adhesive tapes of various types, such as pressure-sensitive adhesive film and pressure-sensitive adhesive tab, have been proposed and used in practice according to diversified purposes. For example, as the pressure-sensitive adhesive tape characterized by removability, a pressure-sensitive adhesive tape capable of being removed without damaging the adherend by stretching the pressure-sensitive adhesive tape has been recently put into practical use.

For example, Patent Document 1 describes a removable adhesive tape comprising a backing having supported on at least one main surface thereof a pressure-sensitive adhesive, wherein the backing has a lengthwise elongation at break of 150 to 1,200%, an elastic recovery of less than 50% after stretching and a Young's modulus of at least 175.8 kg/cm$^2$ (2,500 psi) but less than 5,097 kg/cm$^2$ (72,500 psi), the tape can be firmly bonded to a substrate (corresponds to an adherend referred to in the present invention) and removed after pulling it at an angle of 35° or less from the substrate surface, and the backing has a tensile strength at break sufficiently high not to cause rupture prior to the removal of the tape from the substrate surface. This adhesive tape has good removability, however, in order to meet recent diversified requirements, the adhesive tape is demanded to have epochally excellent properties, for example, good balance between adhesive property and cohesive strength, stability on use under high temperature and high humidity conditions (in a wet and hot environment) or in an environment using water, and prevention of reduction in the adhesive property due to migration of a plasticizer derived from an adherend.

Patent Document 2 describes an adhesive tape for removable adhesion, using a base comprising a thermoplastic rubber such as styrene-butadiene block copolymer and an adhesive-forming resin such as rosin derivative, wherein the adhesive tape has a high rubber elasticity and a low plasticity, the adhesive strength is lower than the cohesive strength, the holding power is appropriately decreased due to elongation of the tape, the ratio of peel strength to tensile strength is 1:2 or more, and the bonding expressed by the adhesive of the tape is cancelled in the direction of adhesion face during stretching of the adhesive tape. It is reported that this adhesive tape can be also removed by stretching without damaging the adherend. However, when this tape is applied to a vinyl chloride-based wall paper containing a plasticizer, the plasticizer migrates into the adhesive to cause a problem that the adhesive strength and cohesive strength both are decreased and the adhesive tape cannot be used.

On the other hand, many pressure-sensitive adhesive tapes suitable for the attaching to a soft vinyl chloride film containing a large amount of plasticizer have been proposed.

For example, Patent Document 3 describes an acrylic pressure-sensitive adhesive tape comprising multiple pressure-sensitive adhesive layers, wherein the exposed pressure-sensitive adhesive layer is formed of a pressure-sensitive adhesive mainly comprising a copolymer of 100 parts by weight of an alkyl(meth)acrylate monomer and from 1 to 10 parts by weight of a nitrogen-containing (meth)acrylic monomer and the pressure-sensitive adhesive layer connected thereto is formed of a pressure-sensitive adhesive mainly comprising a copolymer containing an alkyl(meth)acrylate. It is reported that this pressure-sensitive adhesive tape exhibits a sufficiently high value in both the adhesive strength and the cohesive strength and by virtue of good harmony of these two strengths, ensures very excellent adhesive performance free from migration of a plasticizer or the like on attaching to a vinyl chloride resin, particularly, a plasticized vinyl chloride resin. Base on this knowledge, the present inventors have applied this pressure-sensitive adhesive to the pressure-sensitive adhesive of the adhesive tape described in Patent Document 1. However, the adhesive tape using this pressure-sensitive adhesive has a problem that at the time of separating and removing the adhesive tape from the adherend, for example, adhesive transfer on the adherend is caused due to insufficient cohesive strength of the pressure-sensitive adhesive or the adherend is damaged due to high adhesive strength.

[Patent Document 1]
Japanese National Publication (Kohyo) No. 6-504077 (see, claims)
[Patent Document 2]
German Unexamined Patent Publication (DE-OS) No. 3331016 (see, claims)
[Patent Document 3]
Japanese Unexamined Patent Publication (Kokai) No. 8-311414 (see, claims and paragraph 0040)

SUMMARY

The present invention overcomes the above-described shortcomings in prior art technologies. The present invention provides a removable pressure-sensitive adhesive tape which can be, after attaching to an adherend, easily removed from the adherend by stretching the pressure-sensitive adhesive tape and causes no adhesive transfer on the adherend or no damage of the adherend, and a pressure-sensitive adhesive composition useful for the preparation of such a pressure-sensitive adhesive tape.

The present invention also provides a removable pressure-sensitive adhesive tape having excellent balance between the adhesive strength and the cohesive strength and capable of being advantageously applied to various adherends, and a pressure-sensitive adhesive composition useful for the preparation of such a pressure-sensitive adhesive tape.

The present invention also provides a removable pressure-sensitive adhesive tape which is, when applied to a vinyl chloride-based adherend, typically wall paper, containing a plasticizer, free from occurrence of reduction in the adhesion and cohesive strength due to migration of the plasticizer, and a pressure-sensitive adhesive composition useful for the preparation of such a pressure-sensitive adhesive tape.

Further, the present invention provides a removable pressure-sensitive adhesive tape which application is not restricted to the vinyl chloride-based adherend, and particularly, which can be strongly applied to a wide variety types of adherents having significant surface irregularities or a roughened surface such as a wall paper, film or sheet having a significant irregularity in the surface or walls such as mortar wall, lithin-finished wall or concrete wall, and can be released from the adherends without damaging the same, and a pressure-sensitive adhesive composition useful for the preparation of such a pressure-sensitive adhesive tape.

Furthermore, the present invention provides a removable pressure-sensitive adhesive tape capable of stably maintaining its adhesive strength and other properties even when used under high-temperature and high-humidity conditions or in an environment using water, and a pressure-sensitive adhesive composition useful for the preparation of such a pressure-sensitive adhesive tape.

In addition, the present invention provides an adhesion structure equipped with the above-described pressure-sensitive adhesive tape.

These and other aspects of the present invention will be easily understood from the following detailed description.

BACKGROUND

The pressure-sensitive adhesive tape according to the present invention has an excellent balance between the adhesive strength and the cohesive strength and thus can be advantageously applied to various adherends. In one aspect thereof, the pressure-sensitive adhesive of the present invention, when it is applied to a wall paper, can be released from the wallpaper without damaging the wallpaper. Further, in another aspect thereof, the pressure-sensitive adhesive of the present invention, when it is applied to a wide variety types of adherents having significant surface irregularities or a roughened surface such as a wall paper, film or sheet having a significant irregularity in the surface or walls such as mortar wall, lithin-finished wall or concrete wall, can be strongly adhered to such adherends, and can be released from the adherends without damaging the same.

According to the present invention, the above-described aspects can be attained by a pressure-sensitive adhesive composition which comprises a cohesive component comprising a styrene-based block copolymer, and a basic component.

Also, according to the present invention, a pressure-sensitive adhesive tape comprising a stretchable substrate and a pressure-sensitive adhesive layer provided on at least one surface of the substrate, the pressure-sensitive adhesive layer comprising the above-described pressure-sensitive adhesive composition comprising a cohesive component and a basic component of the present invention, is provided.

Furthermore, according to the present invention, an adhesion structure comprising the pressure-sensitive adhesive tape of the present invention and an adherend having attached thereto the pressure-sensitive adhesive tape through the pressure-sensitive adhesive layer, wherein the pressure-sensitive adhesive tape can be separated from the adherend by stretching the substrate of the pressure-sensitive adhesive tape, is provided.

As well understood from the following detailed description, when the pressure-sensitive adhesive composition of the present invention is used, a removable pressure-sensitive adhesive tape capable of so-called "stretch-release", which can be, after attaching to an adherend, easily removed from the adherend by stretching the pressure-sensitive adhesive tape, can be provided. The pressure-sensitive adhesive tape of the present invention not only requires no pulling with excess force on separating and removing it from an adherend but also causes no adhesive transfer on the adherend or no damage of the adherend itself.

The pressure-sensitive adhesive tape of the present invention is excellent in the balance between the adhesive force and the cohesive force and can be advantageously applied to various adherends. For example, when applied to a vinyl chloride-based adherend containing a plasticizer, the pressure-sensitive adhesive tape of the present invention can be prevented from reduction in the adhesive property due to migration of the plasticizer into the pressure-sensitive adhesive composition layer.

Further, the application of the pressure-sensitive adhesive tape of the present invention is not restricted to the vinyl chloride-based adherends, and the adhesive tape can be strongly applied to a wide variety types of adherents having significant surface irregularities or a roughened surface such as a wall paper, film or sheet having a significant irregularity in the surface or walls such as mortar wall, lithin-finished wall or concrete wall. When it is applied to such adherends, the adhesive tape can be released from the adherends without damaging the same. For example, the film-type adherends suitable in the practice of the present invention include, but not restrictive to, a film of ethylene-vinyl alcohol copolymer resin and a film of styrene-(meth)acrylate copolymer resin. Of course, the adherends referred to herein include a vinyl chloride-based adherend particularly containing a plasticizer.

Furthermore, even when used under high-temperature and high-humidity conditions (in a wet and hot environment) or in an environment using water, the pressure-sensitive adhesive tape of the present invention can be free from reduction in the adhesive strength or other properties and can be stably used over a long period of time.

The adhesion structure of the present invention comprises the pressure-sensitive adhesive tape of the present invention in combination with an adherend and therefore, this adhesion structure can express the above-described noticeable effects ascribable to use of the pressure-sensitive adhesive tape and can be advantageously used in various fields.

As described above, the present invention provides (1) a pressure-sensitive adhesive composition comprising a cohesive component containing a styrene-based block copolymer, and a basic component, (2) a pressure-sensitive adhesive tape, particularly a removable pressure-sensitive adhesive tape capable of being "stretch-released", comprising a stretchable substrate and a pressure-sensitive adhesive layer provided on at least one surface of the substrate, the pressure-sensitive adhesive layer comprising the pressure-sensitive adhesive composition of the present invention, and (3) an adhesion structure equipped with such a pressure-sensitive adhesive tape.

The pressure-sensitive adhesive composition, pressure-sensitive adhesive tape and adhesion structure of the present invention each is described by referring to the attached drawings.

DETAILED DESCRIPTION

Figure 1:
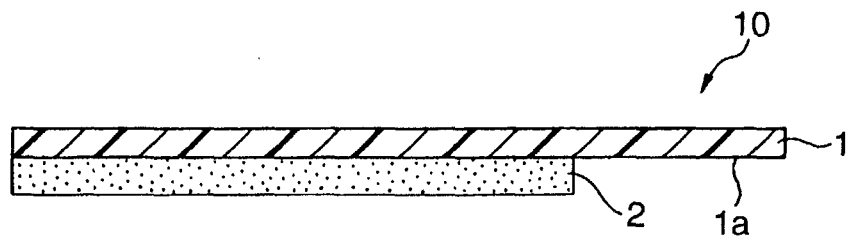
FIG. 1 is a cross-sectional view showing one preferred embodiment of the pressure-sensitive adhesive tape according to the present invention.

FIG. 1 is a cross-sectional view showing one preferred embodiment of the pressure-sensitive adhesive tape of the present invention. In the figure, the removable pressure-sensitive adhesive tape 10 comprises a stretchable substrate 1 and on one surface of the substrate 1, a pressure-sensitive adhesive layer 2 comprising the pressure-sensitive adhesive composition of the present invention is supported. The substrate 1 is stretchable and therefore, on removing the pressure-sensitive adhesive tape 10 from an adherend, the substrate can be appropriately elongated without adversely affecting the operation effects of the present invention. The shown substrate 1 is used as a single layer but, if desired, the substrate may have a multilayer structure of two or more layers and can be used in the form of a composite substrate or a laminate substrate. The pressure-sensitive adhesive layer 2 preferably has a composition or thickness enabling the elongation in accordance with the elongation of substrate 1. The substrate 1 does not have the pressure-sensitive adhesive layer 2 at the end part 1a and this is designed so as to use the end part 1a as a tab on removing the pressure-sensitive adhesive tape 10 and thereby efficiently perform the pulling work for the elongation. If desired, in place of not forming the pressure-sensitive adhesive layer 2, a separately prepared tab or tape strip analogous thereto may be fixed to the end part. In the figure, the pressure-sensitive adhesive layer 2 is applied only to one surface of the substrate 1 but, as described in the following, this layer may be formed on both surfaces of the substrate 1 according to use of the pressure-sensitive adhesive tape.

The pressure-sensitive adhesive of FIG. 1 can be used as described below sequentially by referring to FIG. 2.

Figure 2A:
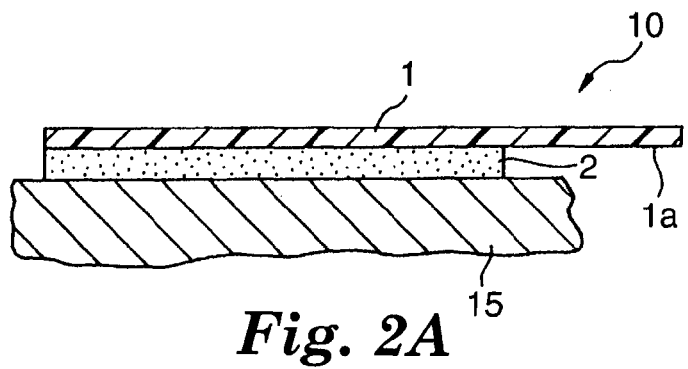
FIGS. 2A, 2B and 2C are a cross-sectional view showing the use method of the pressure-sensitive adhesive tape of FIG. 1.

As shown in FIG. 2(A), the pressure-sensitive adhesive tape 10 of FIG. 1 is attached to an adherend 15 through the pressure-sensitive adhesive layer 2. The attaching may be performed by using a technique commonly used for the attaching of a pressure-sensitive adhesive tape. If desired, a jig or the like may be used in combination. The thus-obtained adherend 15 to which the pressure-sensitive adhesive tape 10 of the present invention is attached through the pressure-sensitive adhesive layer 2 is the adhesive structure of the present invention.

Figure 2B:
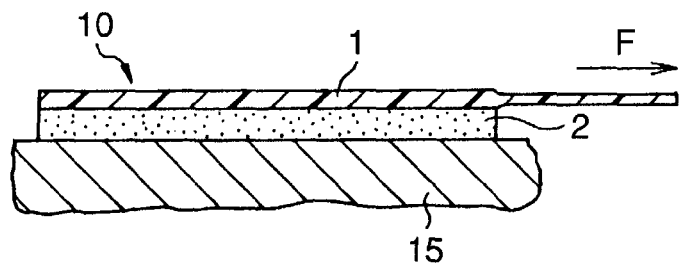
Figure 2C:
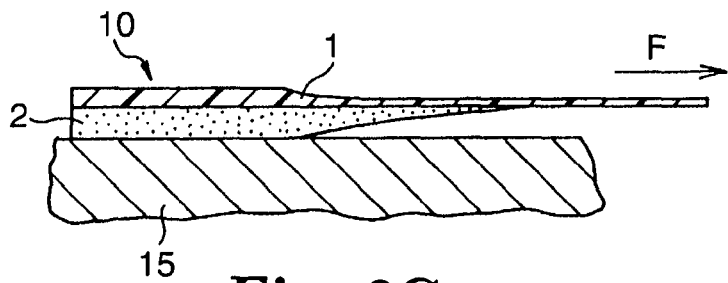

The operation of removing the pressure-sensitive adhesive tape 10 from the adherend 15 is described below. As shown in FIG. 2(B), the tab 1a at the end of the pressure-sensitive adhesive tape 10 is nipped by fingertips and pulled in the direction of arrow F by applying an appropriate force. The pulling angle of pressure-sensitive adhesive tape 10 is usually from the direction substantially parallel to the surface of pressure-sensitive adhesive tape 10 to an angle of about 35° or less from the surface. The pulling angle of pressure-sensitive adhesive tape 10 is preferably about 30° or less, more preferably about 10° or less. At the initial stage of pulling, the initial resistance against the shear force of pressure-sensitive adhesive tape 10 is large. When a force sufficiently large to overcome this resistance is applied, the substrate 1 starts to deform. Along with the deformation of substrate 1, the pressure-sensitive adhesive layer 2 starts to elongate and is oriented. As a result, the substrate 1 yields and the resulting reduction in the cross-sectional area brings about stiffening in the elongation direction. This stiffening effect then causes stress to transfer to the interface between the pressure-sensitive adhesive tape 10 and the adherend 15, effecting separation as shown in FIG. 2(C), with substantially no triaxial stress and no filamentation in the pressure-sensitive adhesive layer 2.

Here, the separation of a highly elongated pressure-sensitive adhesive tape of the present invention at a low angle is characterized by a "sharp" type of crack propagation. Like fracture of a glassy material, a sharp crack leads to high stress concentration at the crack front (where stress is dissipated) having a low volume of adhesive material. This high stress concentration at the crack front leads to so-called brittle cleavage failure of the pressure-sensitive adhesive composition. Such failure typically occurs with a low force (because of the low amount of energy dissipated in the pressure-sensitive adhesive composition) and is cleanly generated at the interface.

In contrast, at a higher peel angle, that is, an angle larger than 35°, the substrate of pressure-sensitive adhesive tape does not stretch and the pressure-sensitive adhesive composition undergoes filamentation and cohesive failure. Like fracture of a glassy material, propagation of a "blunt" crack is preceded by crazing. In this model, the observed filamentation of the pressure-sensitive adhesive composition takes place as an energy dissipation mechanism, similarly to craze fibril found in a glassy material. As the energy dissipation becomes greater, the resistance to separation becomes greater and the force necessary for the separation of pressure-sensitive adhesive tape becomes higher. As the volume of material becomes larger, the energy dissipation becomes greater and, as described above, stress is less concentrated. Accordingly, the filaments of pressure-sensitive adhesive composition are cohesively ruptured to leave residue of pressure-sensitive adhesive composition on the surface of adherend or damage the surface of adherend, as encountered in conventional techniques. As for these properties, if desired, Kohyo No. 6-504077 (supra) can be referred to.

Figure 3:
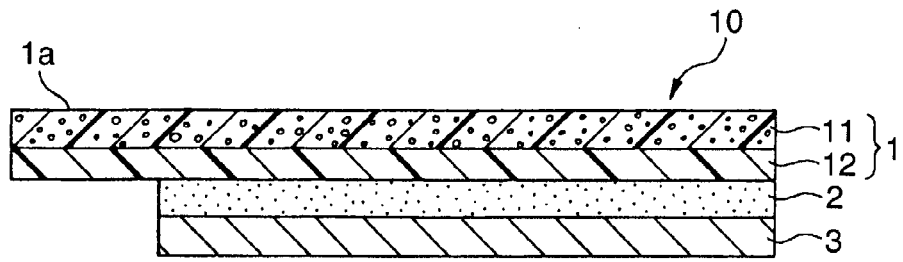
FIG. 3 is a cross-sectional view showing another preferred embodiment of the pressure-sensitive adhesive tape according to the present invention.

The pressure-sensitive adhesive tape 10 shown in FIG. 1 can be variously modified and improved within the scope of the present invention. For example, as shown in FIG. 3, the substrate 1 can comprise two kinds of sheet-like supports 11 and 12. These sheet-like supports 11 and 13 can be composed of various base materials as long as the operation effect of the present invention is not impaired. For example, the sheet-like support 11 can be composed of a foamed plastic film and the sheet-like support 12 integrally laminated therewith can be composed of another polymer film, for example, a foam-free polymer film (in other words, a solid polymer film). On one surface of the substrate 1, as shown in the figure, a pressure-sensitive adhesive layer 2 comprising the pressure-sensitive adhesive composition of the present invention is applied. At the end part of the substrate 1, a tab 1a is formed. Furthermore, the pressure-sensitive adhesive layer 2 is covered with a release paper (also called release liner, peel liner, etc.) referred to as "release layer" in the present invention, so as to enhance the storability or handleability of the pressure-sensitive adhesive tape 10. Such a single-coated pressure-sensitive adhesive tape 10 can be advantageously used, for example, for fitting and fixing a sheet-like adherend such as calender, poster and film, on a wall surface. The sheet-like adherend can also constitute an adhesive structure usually by using a single-coated pressure-sensitive adhesive tape 10.

Figure 4:
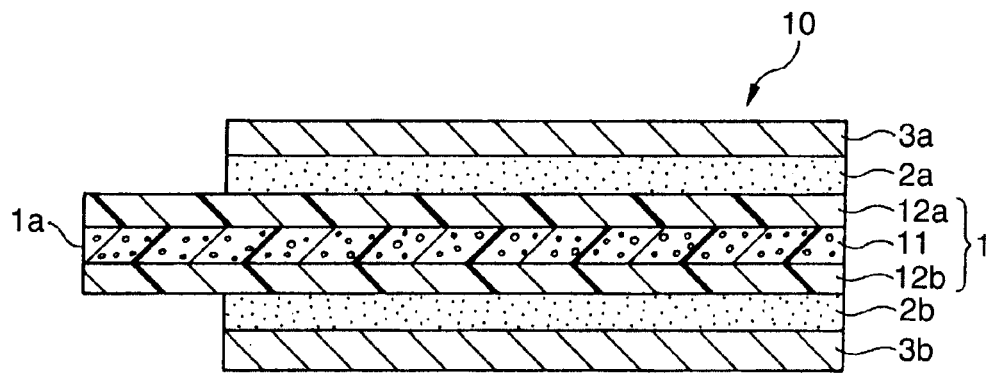
FIG. 4 is a cross-sectional view showing still another preferred embodiment of the pressure-sensitive adhesive tape according to the present invention.

FIG. 4 shows an example of a double-coated pressure-sensitive adhesive tape according to the present invention. As shown in the figure, the substrate 1 may comprise a sheet-like support 11 and sheet-like supports 12a and 12b integrally laminated on both surfaces of the sheet-like support 11. The sheet-like supports 12a and 12b may be the same or different in the composition and thickness. These sheet-like supports 12a and 12b are usually composed of a material different from that of the sheet-like support 11. For example, the sheet-like support 11 can be composed of a foamed polymer film and integrally sandwiched from both sides by sheet-like supports 12a and 12b each composed of a solid polymer film. Of course, a multilayer structure of four or more layers can be applied to this substrate 1. In both sides of the substrate 1, a pressure-sensitive adhesive layer 2a or 2b comprising the pressure-sensitive adhesive composition of the present invention is provided. At the end part of substrate 1, a tab 1a is formed. Furthermore, the pressure-sensitive adhesive layers 2a and 2b each is covered with a release paper 3 referred to as "release layer" in the present invention so as to enhance the storability or handleability of the pressure-sensitive adhesive tape 10. Such a double-coated pressure-sensitive adhesive tape 10 can be advantageously used, for example, for fitting an adherend such as hook on a wall surface. The adherend such as hook can also constitute an adhesive structure usually by using a double-coated pressure-sensitive adhesive tape 10.

As described above, the removable pressure-sensitive adhesive tape of the present invention is constituted by comprising a substrate, a pressure-sensitive adhesive layer and the like. These constituent components are specifically described below.

The pressure-sensitive adhesive tape of the present invention has, as a main material, a stretchable substrate, more specifically, a substrate which can be elongated at a predetermined elongation ratio when pulled in the lengthwise direction. The substrate which can be used preferably comprises a highly extensible polymer film. The term "highly extensible" as used herein means a property such that when a pressure-sensitive adhesive tape (substrate) is stretched in the lengthwise direction, an elongation of at least about 150% is generated based on the original length. The substrate for use in the present invention can usually generate an elongation of about 50 to 1,200%, though this may vary depending on use of the pressure-sensitive adhesive tape. If the elongation ratio of substrate is less than 50%, the stretch-release effect by the present invention cannot be obtained, whereas if the elongation ratio of substrate exceeds 1,200%, it is difficult to separate the pressure-sensitive adhesive tape from the adherend at the right timing. The substrate can preferably generate an elongation of about 150 to 700%, more preferably from about 350 to 700%.

The highly extensible polymer film which can be used as the substrate includes various polymer films but preferably, the following polymer films (1) to (4) can be used individually or in arbitrary combination of two or more thereof as the tape substrate.

(1) A polymer film having a lengthwise elongation at break of about 50 to 1,200%, an elastic recovery of less than 50% after stretching, and a Young's modulus of about 1,000 to 72,500 psi (namely, about 6,894.7 to 499,865.8 KPa) (first polymer film);

(2) A foamed polymer film (second polymer film);

(3) A polymer film having a stress of about 20 N/15 mm or less at the yield point or proportional limit point, a tensile rupture strength of about 30 N/15 mm or more and an elongation at break of about 150% or more (third polymer film); and (4) A polymer film comprising a thermoplastic rubber and an adhesive-forming resin (fourth polymer film).

In the case of using these and other polymer films in combination of two or more, the polymer films are preferably used by integrally binding the entire polymer film in the form of a composite film, a laminate film or the like. The method for integrating the polymer films is not particularly limited and examples thereof include co-molding, joining by an adhesive, and joining under pressure.

The polymer films (1) to (4) each is described in more detail below. Unless otherwise indicated, the composition, structure and the like of each polymer film can apply to other polymer films.

First polymer film is a highly extensible polymer film having a lengthwise elongation at break of about 50 to 1,200%, preferably from about 150 to 700%, more preferably from about 350 to 700%, an elastic recovery after stretching of less than about 50%, preferably less than about 30%, more preferably less than about 20%, and a Young's modulus of at least about 1,000 psi (about 6,894.7 KPa), preferably about 2,500 psi (about 17,236.8 KPa), more preferably at least about 3,000 psi (about 20,684.1 KPa), but about 72,500 psi (about 499,865.8 KPa) or less, preferably about 50,000 psi (about 344,735 KPa) or less, more preferably about 5,000 to 30,000 psi (about 34,473.5 to 206,841 KPa). In this polymer film, if the Young's modulus is too high, it is very difficult to attain elongation of the pressure-sensitive adhesive tape sufficiently large to cause clean release upon stretching, whereas if the Young's modulus is too low, the pressure-sensitive adhesive tape loses its plasticity and becomes rubbery. The elongation at break of the substrate must be sufficiently high so that the substrate is not ruptured prior to removal of the pressure-sensitive adhesive tape from the surface of adherend to which the tape is adhered. The elongation at break of the substrate is preferably at least about 4,000 psi (about 27,578.8 KPa), more preferably at least about 5,300 psi (about 36,541.9 KPa), and most preferably at least about 6,300 psi (about 43,436.6 KPa).

Representative examples of the material suitable for such a polymer film include, but are not limited to, polyolefins such as polyethylene, e.g., high-density polyethylene, low-density polyethylene, linear low-density polyethylene, and linear ultra low-density polyethylene, polypropylene and polybutylene; vinyl copolymers such as polyvinyl chloride (including both plasticized and unplasticized) and polyvinyl acetate; olefinic copolymers such as ethylene/methacrylate copolymer, ethylene/vinyl acetate copolymer, acrylonitrile-butadiene-styrene copolymer and ethylene/propylene copolymer; acrylic polymers and copolymers; and combinations thereof. Also, plastic or plastic and elastomeric materials such as polypropylene/polyethylene, polyurethane/polyolefin, polyurethane/polycarbonate and polyurethane/polyester may be arbitrarily used. These polymer films can be used in the form of a single-layer or multilayer film, a non-woven film, a porous film, a foam film or a combination thereof. The polymer film may also be a filled material such as filled film (e.g., calcium carbonate filled polyolefin). The polymer film is preferably selected from polyethylene and polypropylene films, with the most preferred materials being linear low-density and ultra low-density polyethylene films.

Such a polymer film can be produced by any known film-forming method such as extrusion, co-extrusion, solvent casting, foaming and felting.

The polymer film may have any thickness as long as it has integrity sufficiently high to be processable and handleable. The thickness is preferably from about 10 to 250 μm. If the thickness of polymer film is less than 10 μm, when the pressure-sensitive adhesive composition used has bleeding property, the bleeding of pressure-sensitive adhesive composition may not be prevented and this is not preferred. On the other hand, if the thickness of polymer film exceeds 250 μm, the separation and removal of the pressure-sensitive adhesive tape from the adherend tends to require a stretching force higher than desired and therefore, the removal becomes difficult. A thinner polymer film is liable to provide easier removal than a thicker polymer film. As for this first polymer film, if desired, Kohyo No. 6-504077 (supra) may be referred to.

The second polymer film is a foamed polymer film, in other words, a layer or film of polymer foam. Representative examples of the material suitable for the foamed polymer film include, but are not limited to, polyolefins such as polyethylene including high-density polyethylene, low-density polyethylene, linear low-density polyethylene and linear ultra low-density polyethylene, polypropylene and polybutadiene; vinyl copolymers such as polyvinyl chloride (including both plasticized and unplasticized) and polyvinyl acetate; olefin-based copolymers such as ethylene/methacrylate copolymer, ethylene/vinyl acetate copolymer, acrylonitrile-butadiene-styrene copolymer and ethylene/propylene copolymer; acrylic polymers and copolymers; polyurethanes; and combinations thereof. Also, any plastic material or any mixture or blend of plastic and elastomeric material, such as polypropylene/polyethylene, polyurethane/polyolefin, polyurethane/polycarbonate and polyurethane/polyester, can be used.

The foamed polymer film generally has a density of about 2 to 30 lb/ft$^3$ (about 32 to 481 kg/m$^3$) and with a density in this range, the foam of polymer film is pulled and the separation of pressure-sensitive adhesive tape from the adherend can be suitably achieved.

Particularly preferably, the foamed polymer film is a polyolefin-based foamed film. Among these foamed polymer films, most preferred are polyolefin foams "Voltextra (trademark)" (trade name) and "Volara (trademark)" (trade name) produced by Voltek Division of Sekisui America Corporation, Massachusetts, U.S.A.

If desired, in combination with such a foamed polymer film, or in a particular case, in place of the foamed polymer film, a foam-free, namely, solid polymer film may be used. This polymer film is preferably selected from polyethylene and polypropylene films but the most preferred materials are linear low-density polyethylene film and linear ultra low-density polyethylene film. A preferred polyethylene film is "Maxilene (trademark) 200" (trade name) produced by Consolidated Thermoplastics, Illinois, U.S.A.

The foamed polymer film may have an arbitrary thickness as long as it has satisfactory processability and handleability and gives preferred performance regarding the tensile properties for separating the pressure-sensitive adhesive tape from the adherend. This thickness is usually from about 10 to 250 μm, preferably from about 10 to 150 μm. As for this second polymer, if desired, Japanese National Publication (Kohyo) No. 9-502213 may be referred to.

The third polymer film is a polymer film having a stress of about 20 N/15 mm or less at the yield point or proportional limit point, a tensile rupture strength of 30 N/15 mm or more and an elongation at break of 150% or more. This polymer film has a small thickness and a high modulus, nevertheless, exhibits a low yield strength and a sufficiently large elongation and therefore, on use as the tape substrate of the pressure-sensitive adhesive tape, can be separated without causing generation of curling. This polymer film has all of the following properties: the stress at the yield point or proportional limit point is about 20 N/15 mm or less irrespective of thickness, the tensile rupture strength (rupture strength) is about 30 N/15 mm or more at an arbitrary thickness, and the lengthwise elongation at break (extensibility) is about 150% or more, particularly from about 150 to 1,500%.

In this polymer film, the modulus thereof is a stress at the initial stage on pulling the substrate and the stress substantially accompanying the stretch-release is composed of a sum of the stress at the yield point or proportional limit point of the substrate and the adhesive strength at the pulling angle. Accordingly, as long as the yield point or proportional limit point is sufficiently low, even a material having a high Young's modulus can provide a pressure-sensitive adhesive tape having a tensile strength satisfying the requirement of users by combining it with an appropriate pressure-sensitive adhesive composition. Moreover, the material having a high Young's modulus is favored with stiffness and therefore, more facilitated in the handling by users.

This polymer film preferably exhibits 50% or less elastic recovery after elongation, because in the case of pressure-sensitive adhesive tape of the present invention, it is preferred that the substrate used therefor loses its elasticity after once elongated by stretch-release. This polymer film is highly extensible and has a high rupture strength, so that when a pressure-sensitive adhesive tape is produced by using it as the substrate, the pressure-sensitive adhesive tape can be easily stretch-released when desired without damaging the adherend surface while leaving substantially no pressure-sensitive adhesive residue after the release.

Examples of the polymer which can be advantageously used for the formation of such a polymer film include, but are not limited to, polyolefins such as high-density polyethylene (HDPE), low-density polyethylene (LDPE), linear low-density polyethylene (LLDPE), linear ultra low-density polyethylene (U-LLDPE) and polypropylene (PP); polyvinyl polymers such as polyvinyl chloride (PVC) and polyvinyl acetate (PVA); polyolefin-based copolymers such as ethylene-methacrylic acid copolymer (EEMA) and ethylene-vinyl acetate copolymer (EVA); block copolymers such as acrylic polymer and styrene-isoprene-vinyl acetate copolymer; and various thermoplastic elastomers (TPE) such as polyolefin. The polymer film may be formed by using these polymers individually or in combination of two or more thereof.

The polymer film may be composed of a single layer of the above-described polymer film or may be a composite film obtained by laminating and integrating two or more polymer films. In the latter case, it may suffice if the above-described polymer film is contained in at least one layer of the composite film. However, in the case of the polymer film for use in the present invention, its tensile stress is preferably 10% or less based on the normal stress of 2 MPa. This is effective for preventing the pressure-sensitive adhesive tape from curling which occurs due to bending stress generated at the time of taking off the tape from its own back (in the case of a roll form) or from the release paper when finished as a thin pressure-sensitive adhesive tape.

This polymer film may be a film of various forms. Examples of suitable films include non-woven film, woven film, porous film and foam film. If desired, films differing in the form may be combined and used as one polymer film.

The thickness of this polymer film may be varied over a wide range according to use, however, the thickness is usually in the range preferably from about 10 to 250 μm, more preferably from about 30 to 100 μm. If the thickness of the polymer film is less than 10 μm, a sufficiently high tensile strength cannot be maintained due to excessive thinness or a backing strength large enough to endure the practical use, which is an object of the present invention, cannot be exerted and the polymer film does not function any more as a substrate of the pressure-sensitive adhesive tape in some cases. On the other hand, if the thickness exceeds 250 μm, the operation of separating the pressure-sensitive adhesive tape from an adherend becomes substantially difficult due to high tensile strength and the effect of thinning the pressure-sensitive adhesive tape is also impaired.

This polymer film can be produced by using the method commonly employed for the production of a polymer film. For example, a composite structure-type polymer film can be produced by simultaneously extruding respective raw material polymers for first and second polymer films from appropriate dies and subsequently stretching the film. Also, respective polymer film previously prepared may be laminated and then integrated by fusion. Depending on the case, respective polymer films may be joined by using an adhesive or the like. As for this third polymer film, if desired, Japanese Unexamined Patent Publication (Kokai) No. 2002-167558 may be referred to.

The fourth polymer film is a polymer film comprising a thermoplastic rubber and an adhesive-forming resin, that is, a rubber-resin type polymer film. The rubber component is non-vulcanized and is used for imparting necessary rubber elasticity and cohesive strength to the polymer film. Examples of the thermoplastic rubber which can be used include a styrene-butadiene block copolymer and a styrene-isoprene block copolymer. On the other hand, the resin component is used for realizing excellent adhesion to various adherends. Examples of the adhesive-forming resin which can be used include natural or synthetic resins which can be present as an ester or a free acid, such as rosin derivative, terpene resin, terpene-phenol resin and synthetic petroleum resin. This resin may be hydrogenated, disproportionated or dimerized.

If desired, the polymer film may contain additives commonly used in the field of polymer film, such as antioxidant, ultraviolet stabilizer and coloring agent.

The thickness of this polymer film may be varied over a wide range but is usually from about 200 to 600 μm.

This polymer film may be produced in accordance with various techniques but is generally produced by dissolving the above-described rubber component and resin component in a solvent such as benzine, coating the obtained high-concentration solution on a release paper or the like by using an applicator, and drying it. The polymer film may be more simply and easily produced by a method of mixing a raw material mixture under heat and casting or extruding it at a temperature of about 120 to 160° C. As for this fourth polymer film, if desired, DE-OS 3331016 (supra) may be referred to.

These polymer films and other polymer films useful as the substrate in practice of the present invention may be variously modified or improved within the scope of the present invention. For example, an organic or inorganic filler may be dispersed in the polymer film, if desired. Examples of the inorganic filler include calcium carbonate, titanium oxide and silica. These fillers are useful for more enhancing the stiffness of film or lowering the yield point to suppress the tensile strength of film.

The organic or inorganic filler contained in the polymer film may have various shapes and sizes, but a spherical particle, a needle-like crystal or a shape analogous thereto is preferred. The size may be widely varied but is usually from about 1 to 20 μm. For example, in the case of a needle-like whisker, a relatively fine whisker is preferred and the length thereof is preferably from about 1 to 15 μm, more preferably in the vicinity of about 10 μm. The diameter of the needle-like whisker is usually in the vicinity of about 0.1 μm. If the size of the filler used here is less than 1 μm, a large amount of filler must be used for obtaining the addition effect of filler, whereas if it exceeds 20 μm, this may adversely affect the film formation or other desired effects.

The filler may be contained in the polymer film in an arbitrary amount over a wide range but is usually added in the range preferably from about 5 to 50 wt %. If the amount of the filler added is less than 5 wt %, the addition effect is not exerted, whereas if it exceeds 50 wt %, this may adversely affect the film formation or other desired effects. Usually, the filler is preferably used in an amount in the vicinity of about 10 wt %.

If desired, the polymer film may be colored to any desired color. When colored, the finally obtained pressure-sensitive adhesive tape is improved in the appearance, handleability and the like. The color of the polymer film may be a single color or may be a combination of two or more colors so as to improve the design property. In the case where the substrate has a multilayer structure, one or more polymer film constituting the structure may be arbitrarily colored.

Furthermore, insofar as the use as the substrate of the pressure-sensitive adhesive tape is not adversely affected and when an additional operation effect is expected to come out, the polymer film may have other additional layers which are integrated, if desired, in the field of pressure-sensitive adhesive tape, such as reinforcing layer, cushion layer and release layer.

For the substrate of the pressure-sensitive adhesive tape, the above-described polymer films and other suitable polymer films may be used as a single layer or as a multilayer or composite structure of two or more layers. In use as a multilayer structure, polymer films or the like of the same kind may be laminated or two or more kinds of polymer films or the like may be arbitrarily combined and laminated. In each case, a different material other than the substrate for use in the present invention may be laminated on the surface of the obtained multilayer structure or may be inserted into the inside thereof.

The substrate may be variously changed in the thickness according to the constitution or use of the pressure-sensitive adhesive tape, however, the thickness is generally from about 10 μm to about 30 mm. If the thickness of the substrate is less than 10 μm, the production of a pressure-sensitive adhesive tape becomes difficult due to excessively small thickness and also, the handleability of the pressure-sensitive adhesive tape itself decreases, whereas if the thickness of the substrate exceeds 30 mm, not only the obtained pressure-sensitive adhesive tape decreases in the handleability due to its excessively large thickness but also the production cost increases and the use is limited. The thickness of the substrate is preferably from about 10 μm to about 10 mm.

The substrate may be used as it is or an auxiliary pressure-sensitive adhesive layer may be provided on one surface or both surfaces thereof. More specifically, when the substrate is composed of a polymer film, an auxiliary pressure-sensitive adhesive layer comprising a pressure-sensitive adhesive the same as or different from the pressure-sensitive adhesive composition constituting the pressure-sensitive adhesive tape is preferably provided on one surface or both surfaces of the polymer film. By previously providing an auxiliary pressure-sensitive adhesive layer on one surface or both surfaces of the substrate, for example, the joining effect of a pressure-sensitive adhesive layer or the effect of preventing the generation of adhesive transfer or damage on the adherend can be more enhanced.

The auxiliary pressure-sensitive adhesive layer or the pressure-sensitive adhesive layer may be formed on the substrate without applying any treatment to the surface of the substrate, however, for elevating the adhesion effect therebetween, the surface of the substrate is preferably subjected to a primer treatment in advance. Examples of the primer treatment include corona discharge treatment, plasma discharge treatment, flame treatment, electron beam irradiation, ultraviolet irradiation and primer coating.

The pressure-sensitive adhesive tape of the present invention is characterized by having, in combination with the above-described substrate, a pressure-sensitive adhesive layer comprising the pressure-sensitive adhesive composition of the present invention on one surface or both surfaces of the substrate. The pressure-sensitive adhesive composition of the present invention is usually constituted by at least two kinds of components. In the practice of the present invention, it is advantageous to use a first component (cohesive component) having cohesive strength and a second component (basic component) in combination. Particularly, use of a pressure-sensitive adhesive composition containing at least a mixture of these two kinds of components is advantageous. Each component is described below.

(1) First Component

The first component is a cohesive component. The cohesive component contains a styrene-based block copolymer as the main component. Examples of the styrene-based block copolymer useful for the practice of the present invention include a styrene-isoprene block copolymer, a styrene-butadiene block copolymer, a styrene-ethylene-propylene block copolymer and a styrene-ethylene-butylene block copolymer.

In addition to the styrene-based block copolymer, the cohesive component may contain a tackifier. Suitable examples of the tackifier include, but are not limited to, rosin resin, rosin ester resin, hydrogenated rosin ester resin, terpene resin, terpene phenol resin, hydrogenated terpene resin, petroleum resin, hydrogenated petroleum resin, chroman resin, styrene resin, modified styrene resin, xylene rein and epoxy resin.

If desired, the first component may further contain other additives. Suitable examples of the additive include a softening agent, an anti-aging agent and an ultraviolet absorbent. Examples of the softening agent include paraffin-based, naphthene-based or phthalic acid ester-based softening agents. Examples of the anti-aging agent include hindered phenol-based or hindered amine-based antioxidants.

(2) Second Component

The second component is a basic component. The basic component contains a (meth)acrylic copolymer, preferably a nitrogen-containing (meth)acrylic copolymer, as the main component. The nitrogen-containing (meth)acrylic copolymer includes copolymers of various types but preferred are copolymers of an alkyl(meth)acrylate and a nitrogen-containing vinyl monomer.

The copolymer of an alkyl(meth)acrylate and a nitrogen-containing vinyl monomer may be prepared by copolymerizing an alkyl(meth)acrylate and a nitrogen-containing vinyl monomer at various mixing ratios, however, this copolymer preferably comprises from about 45 to 99.9 parts by weight of an alkyl(meth)acrylate and from about 0.1 to 20 parts by weight of a nitrogen-containing vinyl monomer. If desired, this nitrogen-containing (meth)acrylic copolymer may be grafted with from 0 to about 20 parts by weight of a polystyrene having a glass transition point of about 20 to 250° C. and a weight average molecular weight of about 2,000 to 500,000 as measured by gel permeation chromatography (GPC), because the mixed pressure-sensitive adhesive composition solution does not readily undergo the separation into upper and lower two layers in the solution state. Furthermore, if desired, a vinyl monomer having a reactive functional group on the side chain may be copolymerized in an amount of about 0.1 to 5 parts by weight.

More specifically, the alkyl(meth)acrylate which can be used for the preparation of the nitrogen-containing (meth)acrylic copolymer is a (meth)acrylic acid ester of an alkyl group having from about 1 to 11 carbon atoms. Typical examples of such a (meth)acrylic acid ester include, but are not limited to, methyl ester of (meth)acrylic acid, ethyl ester of (meth)acrylic acid, butyl ester of (meth)acrylic acid, 2-methylbutyl ester of (meth)acrylic acid, t-butyl ester of (meth)acrylic acid, 2-ethylhexyl ester of (meth)acrylic acid, isooctyl ester of (meth)acrylic acid, cyclohexyl ester of (meth)acrylic acid and isoboronyl ester of (meth)acrylic acid. These (meth)acrylic acid esters may be used individually or in combination of two or more thereof.

The nitrogen-containing vinyl monomer is preferably a vinyl monomer having an amide group or a tertiary amino group. Typical examples of such a nitrogen-containing vinyl monomer include, but are not limited to, N,N-dimethylacrylamide, N-isopropylacrylamide, N,N-dimethylaminoethyl (meth)acrylate, N,N-dimethylaminopropylacrylamide, 2-vinylpyridine, 4-vinylpyridine and 1-vinylimidazole. These nitrogen-containing vinyl monomers may be used individually or in combination of two or more thereof.

At the copolymerization with the alkyl(meth)acrylate, the nitrogen-containing vinyl monomer may be copolymerized at various ratios but usually, the ratio thereof is preferably from about 0.1 to 20 parts by weight. If the ratio of this vinyl monomer is less than 0.1 part by weight, the adhesion to the adherend such as soft vinyl chloride may be insufficient, whereas if it exceeds 20 parts by weight, a low molecular weight (meth)acrylate-based copolymer may be produced during the copolymerization of the second component.

In preparing the nitrogen-containing (meth)acrylic copolymer according to the present invention, a polystyrene may be grafted to the (meth)acrylic copolymer. One simple and easy method for grafting is, for example, a method of copolymerizing a styrene macromer. The synthesis method of styrene macromer is described in detail in Japanese Unexamined Patent Publication (Kokai) No. 59-75975 and this is not particularly described here. The styrene macromer may also be commercially available under the trade name of "Macromonomer AS-6S" from Toagosei Chemical Industry Co., Ltd. Of course, the polystyrene may be grafted by using a method other than that described above.

In the case of a vinyl monomer having a reactive functional group on the side chain in the preparation of the nitrogen-containing (meth)acrylic copolymer, examples of the vinyl monomer include, but are not limited to, carboxyl group-containing vinyl monomers such as acrylic acid, methacrylic acid, itaconic acid and maleic acid, acid anhydrides thereof, and hydroxyl group-containing vinyl monomers such as 2-hydroxyethyl acrylate and 2-hydroxyethyl methacrylate. A crosslinking reaction site may be imparted to the (meth)acrylic resin composition by this vinyl monomer having a polar group such as carboxyl group or hydroxyl group, or a vinyl group having a photoreactive group such as acryloylbenzophenone.

Also, a crosslinking reaction starting from the crosslinking reaction site may be induced by using a crosslinking agent in combination. As the crosslinking agent, a crosslinking agent usually used in the chemistry of polymerization, for example, a polyfunctional epoxy compound, a polyfunctional melamine compound, a polyfunctional isocyanate compound, a metal-based crosslinking agent or a polyfunctional azilidine compound, may be used. Alternatively, a crosslinking reaction may be induced by radiation such as UV or EB, without using a crosslinking agent.

In the pressure-sensitive adhesive composition of the present invention, those first and second components may be mixed at various ratios and the mixing ratio is not particularly specified. The mixing ratio of the first component to the second component is usually from about 5:95 to about 95:5 (as solid content), preferably from about 25:75 to about 90:10. When the mixing ratio of two components is within this range, the cohesive strength of the pressure-sensitive adhesive is sufficiently high and therefore, the separation and removal of the pressure-sensitive adhesive tape from the adherend can be free of a problem such as adhesive transfer on the adherend or damage of the adherend due to high adhesive strength. Furthermore, even when the adhesive structure of the present invention is produced by attaching the pressure-sensitive adhesive tape to a vinyl chloride-based sheet or wall paper containing a plasticizer, the pressure-sensitive adhesive tape can be prevented from serious reduction in the cohesive strength or adhesive strength due to migration of the plasticizer into the pressure-sensitive adhesive layer.

According to use or constitution of the pressure-sensitive adhesive tape, the pressure-sensitive adhesive layer is applied only to one surface of the tape substrate or applied to both surfaces of the tape substrate. In either case, the thickness of the pressure-sensitive adhesive layer can be varied over a wide range according to use or constitution of the pressure-sensitive adhesive tape. The thickness of the pressure-sensitive adhesive layer is usually from about 10 to 1,000 μm, preferably from about 10 to 400 μm, more preferably from about 10 to 200 μm. Within this preferred range of thickness, a thicker layer is liable to facilitate the removal of pressure-sensitive adhesive tape as compared with a thinner layer. This is in contrast to ordinary removal method, for example, removal by separation at a peel angle of 90° or more. In general, a thicker layer before adhesion tends to cause the pressure-sensitive adhesive tape to exhibit a higher peel strength at a peel angle of 180° as compared with a thinner layer. When the pressure-sensitive adhesive tape of the present invention is removed by stretching at a low angle of less than 35°, the pressure-sensitive adhesive composition is readily constrained by the tape substrate and forced to undergo significant elongation. Under these conditions, the pressure-sensitive adhesive layer (in the case of multiple layers, each pressure-sensitive adhesive layer) contracts and this causes reduction in the cross-sectional area. Since the cross-sectional area, namely, thickness×width, of a thinner pressure-sensitive adhesive layer is already less than that of a thicker pressure-sensitive adhesive layer, the stress, namely, force per unit area, is greater in the thinner layer than in the thicker layer. This leads, in effect, to stiffening of the pressure-sensitive adhesive composition. A stiffer layer exhibits higher resistance to deformation and therefore, the force required for separation becomes larger.

The pressure-sensitive adhesive layer may be used as it is but is preferably used after covering the layer with a release layer, typically a release paper (also called peel liner, release liner or the like). By covering the pressure-sensitive adhesive layer with a release paper, the pressure-sensitive adhesive tape is improved in the handleability and can be formed into a roll. Examples of the release paper include paper or plastic film subjected to a release treatment with a silicone compound or the like.

The pressure-sensitive adhesive tape of the present invention can be produced according to an arbitrary method conventionally commonly employed for the production of a pressure-sensitive adhesive tape or the like. For example, the pressure-sensitive adhesive composition may be coated directly on one surface or both surfaces of the substrate. Alternatively, a pressure-sensitive adhesive layer may be separately formed as an independent layer and then this pressure-sensitive adhesive layer may be laminated on the substrate. For the coating, a commonly employed method such as knife coating and hot melt coating may be used. As described above, the surface of the substrate is preferably subjected to a primer treatment in advance of the coating or laminating step so as to improve the adhesion of pressure-sensitive adhesive layer to the substrate. In place of the primer treatment, other pretreatments may be applied. Such a pretreatment can be performed with or without a reactive chemical adhesion promoter such as hydroxyethyl acrylate or hydroxyethyl methacrylate, or other reactive species of low molecular weight. The substrate is composed of a polymer film and therefore, corona discharge treatment is generally preferred.

The pressure-sensitive adhesive tape of the present invention is expected to have the above-described noticeable effects and therefore, can be advantageously applied to various adherends including from soft to hard articles. Furthermore, an adhesive structure having excellent properties and the like can be provided. For example, the pressure-sensitive adhesive tape of the present invention can be advantageously used in many technical fields including the following categories:

(1) mounting application such as wall hanging, body side molding of vehicles and handle gripping;

(2) signing application such as road sign, vehicle marking, transportation marking and reflective sheeting;

(3) joining application such as adhering of two or more containers, e.g., boxes;

(4) closure application such as closure of container, e.g., box, closure of food or beverage container, closure of diaper and closure of surgical drape;

(5) removable label such as price label (tag) and identification label on container; and (6) medical application such as bandage.

As an example of the especially useful application, the pressure-sensitive adhesive tape of the present invention can be advantageously applied to a vinyl chloride-based adherend, particularly an adherend comprising a vinyl chloride resin. This adherend includes molded articles imparted with a predetermined shape or other articles. Suitable examples of the adherend include sheet-like bodies, that is, sheet-like or film-like articles, particularly, wall paper and articles analogous thereto. These articles usually contain a plasticizer represented by a vinyl chloride-based sheet and in conventional pressure-sensitive adhesive tapes, this plasticizer is a great cause of reducing the adhesive property of the pressure-sensitive adhesive tape. In the case of the pressure-sensitive adhesive tape of the present invention, it is found that when this tape is attached to a vinyl chloride-based sheet or similar sheet containing a plasticizer, the adhesive property is not adversely affected and the stretch-release property can be stably maintained. Using the adhesive tape of the present invention, the adhesive tape can be strongly adhered to a vinyl chloride-based wall paper containing a plasticizer, and when it is released from the wall paper, the tape can be removed from the wall paper without damaging the paper.

In addition, the present inventors have found that if the pressure-sensitive adhesive tape is produced through the improvement of the first component (cohesive component) and the second component (basic component) described above, the resulting adhesive tape can be advantageously applied to a wide variety types of adherents having significant surface irregularities or a roughened surface such as a wall paper, sheet or film having a significant irregularity in the surface or walls such as mortar wall, lithin-finished wall or concrete wall. Using the adhesive tape of the present invention, the adhesive tape can be strongly adhered to the adherents having a surface with significant irregularity pattern, and when it is released from the adherends, the tape can be removed from the adherends without causing damaging thereof.

That is, in the pressure-sensitive adhesive tape according to the present invention, when the nitrogen-containing (meth) acrylic copolymer constituting the second component of the adhesive composition comprises a copolymer of an alkyl (meth)acrylate or a derivative thereof and a nitrogen-containing vinyl monomer, and also the alkyl(meth)acrylate comprises isooctyl(meth)acrylate and butyl(meth)acrylate, the adhesive tape can be advantageously applied to wall papers having specific surface irregularities. The utility of the adhesive tape of the present invention is notable, because recently a large number of the wall papers having various surface patterns in view of obtaining good design, including wall papers having significant surface irregularities, are commercially available.

Isooctyl(meth)acrylate and butyl(meth)acrylate may be used and copolymerized at different ratios, but generally the may be used in a ratio of about 80:20 to about 0:100.

Moreover, in the pressure-sensitive adhesive tape of the present invention, an elastomer containing a conjugate double bond may be further added to a styrene-based block copolymer used as the first component of the adhesive composition to improve an adhesion power of the adhesive tape without lowering a cohesive power thereof. The conjugate double bond-containing elastomer additionally used herein includes a wide variety of elastomers, but preferably it includes polybutadiene, polyisoprene or a combination thereof. Desirably, the elastomers have a increased molecular weight, and the average molecular weight of the elastomers generally in the range of about 1,000 to 2,000,000, preferably in the range of about 1,000 to 1,000,000. The addition of such polymeric elastomers to the cohesive component of the adhesive composition results in the effect that use of a process oil can be omitted, for example.

The pressure-sensitive adhesive tape of the present invention can also be advantageously applied to adherends formed of various soft or hard materials such as glass, ceramic, tile, plastic, concrete, wood (including coated wood, laminate and particle board), stone and metal. In addition, these adherends are often used in sites exposed to high temperature and high humidity (in other words, in a wet and hot environment), such as kitchen and bathroom, but even when the pressure-sensitive adhesive tape of the present invention is attached to such an adherend, the adhesive property and stretch-release property of this pressure-sensitive adhesive tape are not impaired. Incidentally, Japanese Unexamined Patent Publication (Kokai) No. 2000-38555 proposes a pressure-sensitive adhesive sheet having excellent resistance against humidity and heat but this sheet can be applied to a hard adherend composed of an inorganic material mainly comprising $SiO_2$, such as glass or tile, by virtue of improvement of the substrate and if applied to a soft adherend, the desired effects cannot be obtained.

EXAMPLES

The present invention will be described below by referring to examples, however, the present invention is of course not limited to these examples.

The abbreviations for indicating starting materials used in the following preparation examples are shown below.

EA: ethyl acrylate
BA: butyl acrylate
IOA: isooctyl acrylate
DMAEA: dimethylaminoethyl acrylate
Vim: 1-vinylimidazole
AA: acrylic acid
StyM: styrene macromer A styrene macromer having the following properties and structural formula was prepared according to the method described in Japanese Unexamined Patent Publication (Kokai) No. 59-75975, page 14, right upper column, Monomer "C-3".

(Properties)
50 wt % solution of methacrylate-terminated polystyrene/cyclohexane weight average molecular weight=13,000 (by GPC)

(Structural Formula)

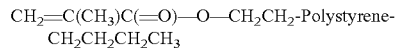

ADVN:
2,2'-azobis(2,4-dimethylvaleronitrile) (azo-type polymerization initiator)
Asaprene™ 411:
styrene-butadiene-styrene block copolymer (produced by Asahi Kasei Chemicals Corporation)
Asaprene™ 1205:
styrene-butadiene block copolymer (produced by Asahi Kasei Chemicals Corporation)
Piccolyte™ A-135:
tackifier (produced by Hercules Chemical Co.)
Finaprene™ 411:
Styrene-butadiene-styrene block copolymer (produced by Fina Oil and Chemical Co.)
Finaprene™ 1205:
Styrene-butadiene block copolymer (produced by Fina Oil and Chemical Co.)
Nipol BR1220SG (trade name):
polybutadiene (produced by Nihon Zeon Co.)
Irganox™ 1330:
phenolic antioxidant (produced by Ciba Specialty Chemicals Co.)
Shellflex™ 371N:
naphthene-based oil (produced by Shell Chemical Co.)
Tuftec™ M1913:
acid-modified styrene-ethylene.butylene-styrene block copolymer (produced by Asahi Kasei Chemicals Corporation)
Septon™ 1001:
styrene-ethylene.propylene block copolymer (produced by Kuraray Co., Ltd.)
Alkon P-90 (trade name):
tackifier (produced by Arakawa Chemical Industries, Ltd.)
Diana Process Oil PW-32 (trade name):
paraffin-based process oil (produced by Idemitsu Kosan Co., Ltd.)

Unless otherwise indicated, the amount ("parts") of the starting material used is "parts by weight".

Preparation Example 1

Preparation of Acrylic Copolymer

As shown in Table 1 below, 81 parts of ethyl acrylate, 12 parts of butyl acrylate, 5 parts of 1-vinylimidazole, 2 parts of acrylic acid and 233.3 parts of ethyl acetate were charged into a pressure glass bottle. Subsequently, 0.2 parts of 2,2'-azobis(2,4-dimethylvaleronitrile) was charged as a polymerization initiator and from the inert gas inlet tube fixed to the glass bottle, nitrogen gas was introduced over 10 minutes, thereby purging the system with nitrogen gas. Immediately after the nitrogen gas purging, the glass bottle was closed with a cover and in a constant temperature water bath at 50° C., the polymerization was allowed to proceed over 20 hours. From the obtained acrylic copolymer solution, the intrinsic viscosity of the acrylic copolymer was measured and found to be 1.19 dl/g.

Preparation Example 2

Preparation of Acrylic Copolymer

The procedure of Preparation Example 1 was repeated but in this example, the starting materials were changed as shown in Table 1. From the obtained acrylic copolymer solution, the intrinsic viscosity of the acrylic copolymer was measured and found to be 1.42 dl/g.

Preparation Example 3

Preparation of Acrylic Copolymer

The procedure of Preparation Example 1 was repeated but in this example, the starting materials were changed as shown in Table 1. From the obtained acrylic copolymer solution, the intrinsic viscosity of the acrylic copolymer was measured and found to be 0.95 dl/g.

Preparation Example 4

Preparation of Acrylic Copolymer

The procedure of Preparation Example 1 was repeated but in this example, the starting materials were changed as shown in Table 1 and toluene was used as the solvent in place of ethyl acetate. From the obtained acrylic copolymer solution, the intrinsic viscosity of the acrylic copolymer was measured and found to be 0.73 dl/g.

Preparation Example 5

Preparation of Acrylic Copolymer

The procedure of Preparation Example 1 was repeated but in this example, the starting materials were changed as shown in Table 1 and a mixed solvent of ethyl acetate and toluene was used as the solvent in place of ethyl acetate. From the obtained acrylic copolymer solution, the intrinsic viscosity of the acrylic copolymer was measured and found to be 0.71 dl/g.

TABLE 1

| Preparation Example | Monomer Mixture (part) | Initiator (part) | Solvent (part) |
|---|---|---|---|
| 1 | EA/BA/Vim/AA (81/12/5/2) | ADVN (0.2) | ethyl acetate (233.3) |
| 2 | EA/BA/StyM/Vim/AA (66/29/7/5/2) | ADVN (0.1) | ethyl acetate (226.3) |
| 3 | 10A/StyM/Vim/AA (69/20/10/1) | ADVN (0.1) | ethyl acetate (165.7) |
| 4 | 10A/StyM/Vim (70/20/10) | ADVN (0.08) | toluene (80.0) |
| 5 | EA/BA/DMAEA/AA (45/40/10/5) | ADVN (0.1) | ethyl acetate (157.8)/toluene (27.9) |

Preparation Example 6

Preparation of Resin Composition Mainly Comprising Styrene-Based Block Copolymer 13.453 Parts of Asaprene™ 411, 7.249 parts of Asaprene™ 1205, 20.681 parts of Piccolyte™ A-135, 0.414 parts of Irganox™ 1330 and 58.204 parts of toluene were charged into a glass bottle and stirred at room temperature overnight. A syrup-like solution of a resin composition mainly comprising a styrene-based block copolymer was obtained.

Preparation Example 7

Preparation of Resin Composition Mainly Comprising Styrene-Based Block Copolymer 13.176 Parts of Asaprene™ 411, 7.095 parts of Asaprene™ 1205, 20.070 parts of Piccolyte™ A-135, 2.027 parts of Shellflex™ 371, 0.405 parts of Irganox™ 1330 and 57.027 parts of toluene were charged into a glass bottle and stirred at room temperature overnight. A syrup-like solution of a resin composition mainly comprising a styrene-based block copolymer was obtained.

Preparation Example 8

Preparation of Resin Composition Mainly Comprising Styrene-Based Block Copolymer 7.500 Parts of Tuftec™ M1913, 2.500 parts of Septon™ 1001, 15.000 parts of Alkon P-90, 5.000 parts of Diana Process Oil PW-32, 14.000 parts of isopropyl alcohol (IPA) and 56 parts of toluene were charged into a glass bottle and stirred at room temperature overnight. A syrup-like solution of a resin composition mainly comprising a styrene-based block copolymer was obtained.

Example 1

Production of Pressure-Sensitive Adhesive Sheet

Pressure-Sensitive Adhesive Sheet 1:

As shown in Table 2 below, the syrup-like resin composition solution (solid content: 80 parts) obtained in Preparation Example 6 and an aziridine-based crosslinking agent (isophthaloylbis-2-methylaziridine; solid content: 0.1 part) were mixed with the acrylic resin composition solution (solid content: 20 parts) obtained in Preparation Example 3 to prepare a pressure-sensitive adhesive solution. The obtained pressure-sensitive adhesive solution was coated on a release paper (silicone-coated PET film) by a knife coater and dried in an oven at 100° C. for 20 minutes. As a result, Pressure-Sensitive Adhesive Sheet 1 with release paper, where the thickness of the pressure-sensitive adhesive layer was 70 μm, was obtained.

Pressure-Sensitive Adhesive Sheet 5:

As shown in Table 2 below, the syrup-like resin composition solution (solid content: 100 parts) obtained in Preparation Example 7 was coated on a release paper (silicone-coated PET film) by a knife coater and dried in an oven at 100° C. for 20 minutes. As a result, Pressure-Sensitive Adhesive Sheet 5 with release paper, where the thickness of the pressure-sensitive adhesive layer was 70 μm, was obtained.

Production of Double-Coated Pressure-Sensitive Adhesive Tape

In this example, a double-coated pressure-sensitive adhesive tape having a layer structure schematically shown in FIG. 4 was produced. That is, as shown in Table 3 below, in the obtained double-coated pressure-sensitive adhesive tape 10, the pressure-sensitive adhesive layer 2a applied to one surface of the substrate 1 was derived from the pressure-sensitive adhesive layer of Pressure-Sensitive Adhesive Sheet 1 and the pressure-sensitive adhesive layer 2b was derived from the pressure-sensitive adhesive layer of Pressure-Sensitive Adhesive Sheet 5.

First, for producing a substrate, a 800 μm-thick foamed polymer film (Volara™ 6EO, produced by Sekisui America Corporation) as a core layer and a 50 μm-thick solid polymer film (XMAX™ 161.1, produced by Consolidated Thermoplastics Co.) as a surface layer were prepared. The solid polymer film was laminated on both surfaces of the foamed polymer film and melt-bonded under heat.

After producing the substrate as above, a corona discharge treatment was applied to both surfaces thereof and further, a primer was coated. The primer used here was reaction-type synthetic resin-based polymer "K-500" (trade name, produced by 3M Company). After the primer treatment, Pressure-Sensitive Adhesive Sheet 1 was attached to one surface of the substrate to form a pressure-sensitive adhesive layer 2a with release paper 3a and Pressure-Sensitive Adhesive Sheet 5 was attached to the opposite surface of the substrate to form a pressure-sensitive adhesive layer 2b with release paper 3b (see FIG. 4).

The resulting double-coated pressure-sensitive adhesive tape was cut into a width of 15 mm and a length of 65 mm and the pressure-sensitive adhesive layer in the portion over a length of 15 mm at the end part was removed to form a tab. As a result, a double-coated pressure-sensitive adhesive tape having a layer structure shown in FIG. 4 was obtained. The pressure-sensitive adhesive tape of this example is called "Double-Coated Pressure-Sensitive Adhesive Tape 1" for distinguishing it from pressure-sensitive adhesive tapes produced in other examples.

[Evaluation Tests]

1. 90° Peel Test (Adhesive Strength Test)

A 2.0 mm-thick soft vinyl chloride resin sheet ("XP-103", trade name, produced by Mitsubishi Chemical Corporation) was prepared as the adherend and lined to a stainless steel sheet by an adhesive. Separately, Pressure-Sensitive Adhesive Sheet 1 prepared above was attached to a 50 μm-thick PET film to produce a test sample with a width of 15 mm and a length of 65 mm.

A 90° peel test of this test sample was performed as follows.

The test sample was attached to the adherend lined to a stainless steel sheet by an adhesive. In an atmosphere of room temperature (23° C.), a rubber roller of 2 kg was reciprocated once on the test sample to press-bond the test sample to the adherend. Thereafter, curing was performed under the following different conditions:

1) at 23° C. for 24 hours,
2) at 65° C. for 12 hours, and
3) at 65° C. for 3 days.

After the completion of curing, each test sample was separated from the adherend by pulling it at a measuring temperature of 23° C., a peel angle of 90° and a pulling rate of 300 mm/min. The force (adhesive strength) required for separation was measured. The measurement results obtained are shown in Table 4 below.

2. Shear Holding Power Test

A 2.0 mm-thick soft vinyl chloride resin sheet ("XP-103", trade name, produced by Mitsubishi Chemical Corporation) and a 2 mm-thick soft vinyl chloride-made wall paper ("TC-2399", trade name, produced by Tesco Company) were prepared as the adherend and each was lined to a stainless steel sheet by an adhesive. Separately, Double-Coated Pressure-Sensitive Adhesive Sheet 1 prepared above was intactly used as a test sample with a width of 15 mm and a length of 65 mm.

A shear holding power test of this test sample was performed as follows.

The pressure-sensitive adhesive layer (pressure-sensitive adhesive layer of Pressure-Sensitive Adhesive Sheet 5, see pressure-sensitive adhesive layer 2b in FIG. 4) of the test sample was attached to the adherend lined to a stainless steel sheet by an adhesive. Another pressure-sensitive adhesive layer (pressure-sensitive adhesive layer of Pressure-Sensitive Adhesive Sheet 1, see pressure-sensitive adhesive layer 2a in FIG. 4) of the test sample was attached with a polystyrene sheet of 16 mm (width)×50 mm (length) after removing the release paper from the layer surface.

Subsequently, in an atmosphere of room temperature (23° C.), a load of 5 kg was applied to the test sample over 30 seconds to press-bond the test sample to the adherend. Thereafter, curing was performed in an oven at 40° C. for 1 hour.

After the completion of curing, a load of 1.0 kg was hung in the lengthwise direction of polystyrene sheet in the oven at 40° C. The time period where the double-coated pressure-sensitive adhesive tape could hold each adherend was measured. The measurement results obtained are shown in Table 4 below.

3. Stretch-Release Test

Figure 5:
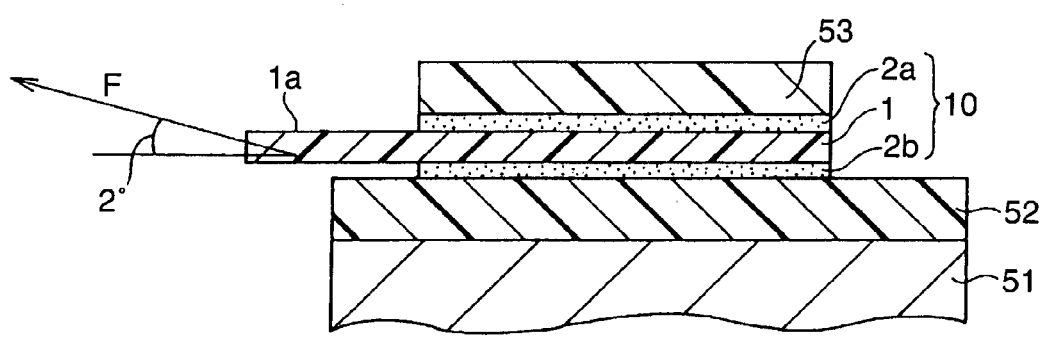
FIG. 5 is a schematic view showing the tester for the stretch-release test, used in Examples.

As shown in FIG. 5, a 2.0 mm-thick soft vinyl chloride resin sheet ("XP-103", trade name, produced by Mitsubishi Chemical Corporation) and a 2 mm-thick soft vinyl chloride-made wall paper ("TC-2399", trade name, produced by Tesco Company) were prepared as the adherend 52 and each was lined to a stainless steel sheet 51 by an adhesive. Separately, Double-Coated Pressure-Sensitive Adhesive Sheet 1 (reference numeral 10 in FIG. 5) prepared above was intactly used as a test sample with a width of 15 mm and a length of 65 mm.

A stretch-release test of this test sample was performed as schematically shown in FIG. 5.

After fixing the adherend 52 in a tester, the pressure-sensitive adhesive layer (pressure-sensitive adhesive layer of Pressure-Sensitive Adhesive Sheet 5, see pressure-sensitive adhesive layer 2b in FIG. 5) of the test sample was attached to the adherend. In an atmosphere of room temperature (23° C.), a stainless steel-made roller of 10 kg was reciprocated once on the test sample to press-bond the test sample to the adherend.

Subsequently, another pressure-sensitive adhesive layer (pressure-sensitive adhesive layer of Pressure-Sensitive Adhesive Sheet 1, see pressure-sensitive adhesive layer 2a in FIG. 5) of the test sample was attached with a polystyrene sheet of 16 mm (width)×50 mm (length) after removing the release paper from the layer surface. Thereafter, curing was performed at 23° C. for 7 days.

After the completion of curing, the tab 1a of the test sample was nipped and pulled in the 2° direction. The peel strength was measured and at the same time, the separation form was observed. The test results obtained are shown in Table 5 below.

Example 2

A pressure-sensitive adhesive sheet and a double-coated pressure-sensitive adhesive tape (this is called "Double-Coated Pressure-Sensitive Adhesive Tape 2") were produced according to the method described in Example 1. In this example, Pressure-Sensitive Adhesive Sheet 2 and Pressure-Sensitive Adhesive Sheet 5 each was produced from the pressure-sensitive adhesive solution shown in Table 2 below and then Double-Coated Pressure-Sensitive Adhesive Tape 2 having a layer structure shown in Table 3 below was produced.

From Double-Coated Pressure-Sensitive Adhesive Tape 2 obtained, a test sample was produced and in accordance with the procedures described in Example 1, a 90° peel test (in this test, the test sample was produced from Pressure-Sensitive Adhesive Sheet 2), a shear holding power test and a stretch-release test were performed. The test results obtained are shown in Tables 4 and 5 below.

Comparative Example 1

A pressure-sensitive adhesive sheet and a double-coated pressure-sensitive adhesive tape (this is called "Double-Coated Pressure-Sensitive Adhesive Tape 3") were produced according to the method described in Example 1. In this example, Pressure-Sensitive Adhesive Sheet 3 and Pressure-Sensitive Adhesive Sheet 5 each was produced from the pressure-sensitive adhesive solution shown in Table 2 below and then Double-Coated Pressure-Sensitive Adhesive Tape 3 having a layer structure shown in Table 3 below was produced.

From Double-Coated Pressure-Sensitive Adhesive Tape 3 obtained, a test sample was produced and in accordance with the procedures described in Example 1, a 90° peel test (in this test, the test sample was produced from Pressure-Sensitive Adhesive Sheet 3), a shear holding power test and a stretch-release test were performed. The test results obtained are shown in Tables 4 and 5 below.

Comparative Example 2

A pressure-sensitive adhesive sheet and a double-coated pressure-sensitive adhesive tape (this is called "Double-Coated Pressure-Sensitive Adhesive Tape 4") were produced according to the method described in Example 1. In this example, Pressure-Sensitive Adhesive Sheet 4 and Pressure-Sensitive Adhesive Sheet 5 each was produced from the pressure-sensitive adhesive solution shown in Table 2 below and then Double-Coated Pressure-Sensitive Adhesive Tape 4 having a layer structure shown in Table 3 below was produced.

From Double-Coated Pressure-Sensitive Adhesive Tape 4 obtained, a test sample was produced and in accordance with the procedures described in Example 1, a 90° peel test (in this test, the test sample was produced from Pressure-Sensitive Adhesive Sheet 4), a shear holding power test and a stretch-release test were performed. The test results obtained are shown in Tables 4 and 5 below.

Comparative Example 3

A pressure-sensitive adhesive sheet and a double-coated pressure-sensitive adhesive tape (this is called "Double-Coated Pressure-Sensitive Adhesive Tape 5") were produced according to the method described in Example 1. In this example, Pressure-Sensitive Adhesive Sheet 5 and Pressure-Sensitive Adhesive Sheet 5 each was produced from the pressure-sensitive adhesive solution shown in Table 2 below and then Double-Coated Pressure-Sensitive Adhesive Tape 5 having a layer structure shown in Table 3 below was produced.

From Double-Coated Pressure-Sensitive Adhesive Tape 5 obtained, a test sample was produced and in accordance with the procedures described in Example 1, a 90° peel test (in this test, the test sample was produced from Pressure-Sensitive Adhesive Sheet 5), a shear holding power test and a stretch-release test were performed. The test results obtained are shown in Tables 4 and 5 below.

Comparative Example 4

A pressure-sensitive adhesive sheet and a double-coated pressure-sensitive adhesive tape (this is called "Double-Coated Pressure-Sensitive Adhesive Tape 6") were produced according to the method described in Example 1. In this example, Pressure-Sensitive Adhesive Sheet 6 and Pressure-Sensitive Adhesive Sheet 5 each was produced from the pressure-sensitive adhesive solution shown in Table 2 below and then Double-Coated Pressure-Sensitive Adhesive Tape 6 having a layer structure shown in Table 3 below was produced.

From Double-Coated Pressure-Sensitive Adhesive Tape 6 obtained, a test sample was produced and in accordance with the procedures described in Example 1, a 90° peel test (in this test, the test sample was produced from Pressure-Sensitive Adhesive Sheet 6), a shear holding power test and a stretch-release test were performed. The test results obtained are shown in Tables 4 and 5 below.

Comparative Example 5

A pressure-sensitive adhesive sheet and a double-coated pressure-sensitive adhesive tape (this is called "Double-Coated Pressure-Sensitive Adhesive Tape 7") were produced according to the method described in Example 1. In this example, Pressure-Sensitive Adhesive Sheet 7 and Pressure-Sensitive Adhesive Sheet 5 each was produced from the pressure-sensitive adhesive solution shown in Table 2 below and then Double-Coated Pressure-Sensitive Adhesive Tape 7 having a layer structure shown in Table 3 below was produced.

TABLE 2

| No. of Pressure-Sensitive Adhesive Sheet | Blending Ratio (ratio of solid content) |
|---|---|
| Pressure-Sensitive Adhesive Sheet 1 | Preparation Example 3/Preparation Example 6/crosslinking agent = 20:80:0.04 |
| Pressure-Sensitive Adhesive Sheet 2 | Preparation Example 4/Preparation Example 8 = 75:25 |
| Pressure-Sensitive adhesive sheet 3 | Preparation Example 1/crosslinking agent = 100:0.1 |
| Pressure-Sensitive Adhesive Sheet 4 | Preparation Example 2/crosslinking agent = 100:0.1 |
| Pressure-Sensitive Adhesive Sheet 5 | Preparation Example 7 = 100 |
| Pressure-Sensitive Adhesive Sheet 6 | Preparation Example 8 = 100 |
| Pressure-Sensitive Adhesive Sheet 7 | Preparation Example 5/crosslinking agent = 100:0.1 |

Note)
Crosslinking agent: aziridine-based crosslinking agent.

TABLE 3

| Example No. | No. of Double-Coated Pressure-Sensitive Adhesive Tape | Pressure-Sensitive Adhesive Layer (2a) | Pressure-Sensitive Adhesive Layer (2b) |
|---|---|---|---|
| Example 1 | Double-Coated Pressure-Sensitive Adhesive Tape 1 | Pressure-Sensitive Adhesive Sheet 1 | Pressure-Sensitive Adhesive Sheet 5 |
| Example 2 | Double-Coated Pressure-Sensitive Adhesive Tape 2 | Pressure-Sensitive Adhesive Sheet 2 | Pressure-Sensitive Adhesive Sheet 5 |
| Comparative Example 1 | Double-Coated Pressure-Sensitive Adhesive Tape 3 | Pressure-Sensitive Adhesive Sheet 3 | Pressure-Sensitive Adhesive Sheet 5 |
| Comparative Example 2 | Double-Coated Pressure-Sensitive Adhesive Tape 4 | Pressure-Sensitive Adhesive Sheet 4 | Pressure-Sensitive Adhesive Sheet 5 |
| Comparative Example 3 | Double-Coated Pressure-Sensitive Adhesive Tape 5 | Pressure-Sensitive Adhesive Sheet 5 | Pressure-Sensitive Adhesive Sheet 5 |
| Comparative Example 4 | Double-Coated Pressure-Sensitive Adhesive Tape 6 | Pressure-Sensitive Adhesive Sheet 6 | Pressure-Sensitive Adhesive Sheet 5 |

TABLE 3-continued

| Example No. | No. of Double-Coated Pressure-Sensitive Adhesive Tape | Pressure-Sensitive Adhesive Layer (2a) | Pressure-Sensitive Adhesive Layer (2b) |
|---|---|---|---|
| Comparative Example 5 | Double-Coated Pressure-Sensitive Adhesive Tape 7 | Pressure-Sensitive Adhesive Sheet 7 | Pressure-Sensitive Adhesive Sheet 5 |

Note)
Pressure-sensitive adhesive layer: see the double-coated pressure-sensitive adhesive tape of FIG. 4.

TABLE 4

| | 90° Peel Test | | | Shear Holding Power Test | |
|---|---|---|---|---|---|
| Example No. | Adhesive Strength After 24 Hours at 23° C. (N/15 mm) | Adhesive Strength After 12 Hours at 65° C. (N/15 mm) | Adhesive Strength After 3 Days at 65° C., (N/15 mm) | Adherend: soft vinyl chloride resin | Adherend: vinyl chloride-made wall paper |
| Example 1 | 25.9 | 14.8 | 7.8 | held for 30 days or more | Fallen after 19 days |
| Example 2 | anchor failure | 23.5 | 14.5 | held for 30 days or more | fallen after 10 days |
| Comparative Example 1 | 13.4 | 35** | 18 | held for 30 days or more | held for 30 days or more |
| Comparative Example 2 | anchor failure | 49.0 | 27.5 | held for 30 days or more | held for 30 days or more |
| Comparative Example 3 | 17.7 | 12.2 | 4 | fallen within 1 day | fallen after 2 days |
| Comparative Example 4 | 25.9 | 14.8** | 7.8** | fallen within 1 day | fallen after 10 minutes |

Note)
Anchor failure: failure between PET PET and pressure-sensitive adhesive sheet.
**Cohesive failure of pressure-sensitive adhesive.

TABLE 5

| | Stretch-Release Test | | | |
|---|---|---|---|---|
| | Adherend: soft vinyl chloride resin | | Adherend: vinyl chloride-made wall paper | |
| Example No. | Peel Strength (N/15 mm) | Separation Form | Peel Strength (N/15 mm) | Separation Form |
| Example 1 | 27.0 | interface separation | 18.5 | interface separation |
| Example 2 | 27.0 | interface separation | 25.5 | interface separation |
| Comparative Example 1 | 24 | anchor failure | 25 | #1 |
| Comparative Example 2 | 24 | anchor failure | 35.0 | cohesive failure |
| Comparative Example 3 | 17.5 | interface separation | 17.5 | interface separation |
| Comparative Example 4 | 18 | interface separation | 18 | interface separation |

Note)
Anchor failure: failure between PET PET and pressure-sensitive adhesive sheet.

1: Wall Paper Failure and Anchor Failure.

As seen from the results in Tables 4 and 5, the double-coated pressure-sensitive adhesive tape of the present invention can express both an adhesive strength verified in the 90° peel test and shear holding power test and a cohesive strength verified in the shear peel test and stretch-release test, with good balance and therefore, the tape can be evaluated as an excellent removable pressure-sensitive adhesive tape.

Test Example 1

In this example, as modifications of evaluation tests performed in Example 1 and Comparative Examples 2 to 4, a 90° peel test (adhesive strength test) and a shear holding powder test were performed after applying a wet-hot curing treatment. The pressure-sensitive adhesive sheets and double-coated pressure-sensitive adhesive tapes used for the production of test samples were those produced in Example 1 and Comparative Examples 1 to 3 and 5. The 90° peel test and shear holding power test were performed fundamentally in accordance with the procedure described in Example 1 except that a wet-hot condition was used in the tests.

1. 90° Peel Test (Evaluation of Wet-Hot Resistance of Adhesive Strength)

A 1 mm-thick slide glass ("S-1126", trade name, produced by Matsunami Glass Ind., Ltd.) and a 2 mm-thick PP (polypropylene) sheet ("DIALITE PEX-2", produced by Kyoei Jushi K.K.) were prepared as the adherend and each was lined with a stainless steel sheet by an adhesive. Separately, as shown in Table 6 below, the pressure-sensitive adhesive sheets produced in Example 1 and Comparative Examples 1 to 3 and 5 each was attached to a 50 μm-thick PET film to produce a test sample with a width of 15 mm and a length of 65 mm.

A 90° peel test of each test sample was performed as follows.

The test sample was attached to the adherend lined with a stainless steel sheet by an adhesive. In an atmosphere of room temperature (23° C.), a rubber roller of 2 kg was reciprocated once on the test sample to press-bond the test sample to the adherend. Thereafter, curing was performed under the following different conditions:

1) at 23° C. for 24 hours, and
2) at 55° C./95% RH for 3 days.

After the completion of curing, each test sample was taken out to room temperature and after 20 minutes, separated from the adherend by pulling it at a measuring temperature of 23° C., a peel angle of 90° and a pulling rate of 300 mm/min. The force (adhesive strength) required for separation was measured. The measurement results obtained are shown in Table 6 below.

TABLE 6

| | | Curing Conditions | | | |
| --- | --- | --- | --- | --- | --- |
| | | 23° C. 24 hour | | 50° C./95% RH 3 days | |
| | Adherend | Glass | PP | Glass | PP |
| Example 1 | Pressure-Sensitive Adhesive Sheet 1 | 16.1 | 2.2* | 7.1 | 4.7 |
| Comparative Example 1 | Pressure-Sensitive Adhesive Sheet 3 | 5.75 | 1.7* | 0.2 | 1.5* |
| Comparative Example 2 | Pressure-Sensitive Adhesive Sheet 4 | 4.1 | 0.7 | 0.25 | 1 |
| Comparative Example 3 | Pressure-Sensitive Adhesive Sheet 5 | 1 | 18 | 0 | 18 |
| Comparative Example 5 | Pressure-Sensitive Adhesive Sheet 7 | 7.7 | 1.6* | 3.6 | 2.0* |

Note)
Unit: N/15 mm
*Jerkily changed.

2. Shear Holding Power Test (Evaluation of Wet-Hot Resistance of Shear Holding Power)

A 5 mm-thick tile ("SO Series", trade name, produced by Danto Corporation) and a 2 mm-thick PP (polypropylene) sheet ("DIALITE PEX-2") were prepared as the adherend and each was lined with a stainless steel sheet by an adhesive. Separately, as shown in Table 7 below, the double-coated pressure-sensitive adhesive tapes produced in Example 1 and Comparative Examples 1 to 3 and 5 each was intactly used a test sample with a width of 15 mm and a length of 65 mm.

A shear holding power test of this test sample was performed as follows.

The pressure-sensitive adhesive layer (pressure-sensitive adhesive layer of one pressure-sensitive adhesive sheet, see pressure-sensitive adhesive layer 2b in FIG. 4) of the test sample was attached to the adherend lined with a stainless steel sheet by an adhesive. Another pressure-sensitive adhesive layer (pressure-sensitive adhesive layer of another pressure-sensitive adhesive sheet, see pressure-sensitive adhesive layer 2a in FIG. 4) of the test sample was attached with a polystyrene sheet of 16 mm (width)×50 mm (length) after removing the release paper from the layer surface.

Subsequently, in an atmosphere of room temperature (23° C.), a load of 5 kg was applied to the test sample over 30 seconds to press-bond the test sample to the adherend. Thereafter, curing was performed in an oven at 50° C. and 95% RH (relative humidity) for 1 hour.

After the completion of curing, a load of 1.0 kg was hung in the lengthwise direction of polystyrene sheet in the oven at 50° C. and 95% RH. The time period where the double-coated pressure-sensitive adhesive tape could hold each adherend was measured. The measurement results obtained are shown in Table 7 below.

TABLE 7

| Example No. | Double-Coated Pressure-Sensitive Adhesive Tape | Tile | PP |
| --- | --- | --- | --- |
| Example 1 | Double-Coated Pressure-Sensitive Adhesive Tape 1 | held for 30 days or more | held for 30 days or more |
| Comparative Example 1 | Double-Coated Pressure-Sensitive Adhesive Tape 3 | fallen within 1 day | fallen within 1 day |
| Comparative Example 2 | Double-Coated Pressure-Sensitive Adhesive Tape 4 | fallen within 1 day | fallen within 1 day |
| Comparative Example 3 | Double-Coated Pressure-Sensitive Adhesive Tape 5 | fallen after 3 hours | held for 30 days or more |
| Comparative Example 5 | Double-Coated Pressure-Sensitive Adhesive Tape 7 | held for 30 days or more | fallen after 2 days |

As seen from the measurement results in Tables 6 and 7, the double-coated pressure-sensitive adhesive tape of the present invention can still maintain good properties even after exposure to wet-hot conditions, needless to say about under normal use conditions.

Test Example 2

In this Example, as modifications of evaluation tests performed in Example 1 and Comparative Examples 2 to 4, a 90° peel test (adhesive strength test) and a shear holding powder test were performed in accordance with the procedure describe in Example 1 by using a plate, an acrylic sheet and a stainless steel sheet as the adherend. The pressure-sensitive adhesive sheets and double-coated pressure-sensitive adhesive tapes used for the production of test samples were those produced in Example 1 and Comparative Example 3.

1. 90° Peel Test

A 9 mm-thick plate, a 2 mm-thick acrylic sheet (PMAA) ("ACRYLITE L-001", trade name, produced by Mitsubishi Rayon Co., Ltd.) and a 0.8 mm-thick stainless steel sheet (SUS-304, produced by JFE Steel) were prepared as the adherend and each was lined with a stainless steel sheet by an adhesive. Separately, the pressure-sensitive adhesive sheets produced in Example 1 and Comparative Example 3 each was attached to a 50 μm-thick PET film to produce a test sample with a width of 15 mm and a length of 65 mm.

A 90° peel test of each test sample was performed as follows.

The test sample was attached to the adherend lined with a stainless steel sheet by an adhesive. In an atmosphere of room temperature (23° C.), a rubber roller of 2 kg was reciprocated once on the test sample to press-bond the test sample to the adherend. Thereafter, curing was performed at 23° C. for 24 hours. After the completion of curing, each test sample was separated from the adherend by pulling it at a measuring temperature of 23° C., a peel angle of 90° and a pulling rate of 300 mm/min. The force (adhesive strength) required for separation was measured. The measurement results obtained are shown in Table 8 below.

TABLE 8

| | Adherend | Plate | Acrylic Sheet | Stainless Steel Sheet |
| --- | --- | --- | --- | --- |
| Example 1 | Pressure-Sensitive Adhesive Sheet 1 | 2.8 | 8.1 | 6.5 |
| Comparative Example 3 | Pressure-Sensitive Adhesive Sheet 5 | 7.6 | 13.2 | 12.3 |

Note)
Unit: N/15 mm

2. Shear Holding Power Test (Evaluation of Heat Resistance of Shear Holding Power)

A 9 mm-thick plate, a 2 mm-thick acrylic sheet (PMAA) ("ACRYLITE L-001", trade name) and a 0.8 mm-thick stainless steel sheet (SUS-304) were prepared as the adherend and each was lined with a stainless steel sheet by an adhesive. Separately, the double-coated pressure-sensitive adhesive tapes produced in Example 1 and Comparative Example 3 each was intactly used a test sample with a width of 15 mm and a length of 65 mm.

A shear holding power test of this test sample was performed as follows.

The pressure-sensitive adhesive layer (pressure-sensitive adhesive layer of one pressure-sensitive adhesive sheet, see pressure-sensitive adhesive layer 2b in FIG. 4) of the test sample was attached to the adherend lined with a stainless steel sheet by an adhesive. Another pressure-sensitive adhesive layer (pressure-sensitive adhesive layer of another pressure-sensitive adhesive sheet, see pressure-sensitive adhesive layer 2a in FIG. 4) of the test sample was attached with a polystyrene sheet of 16 mm (width)×50 mm (length) after removing the release paper from the layer surface.

Subsequently, in an atmosphere of room temperature (23° C.), a load of 5 kg was applied to the test sample over 30 seconds to press-bond the test sample to the adherend. Thereafter, curing was performed in an oven at 40° C. for 1 hour.

After the completion of curing, a load of 1.0 kg was hung in the lengthwise direction of polystyrene sheet in the oven at 40° C. The time period where the double-coated pressure-sensitive adhesive tape could hold each adherend was measured. The measurement results obtained are shown in Table 9 below.

TABLE 9

| | Adherend | | Plate | Acrylic Sheet | Stainless Steel Sheet |
|---|---|---|---|---|---|
| Example 1 | Double-Coated Pressure-Sensitive Adhesive Tape 1 | n = 1 | >30 days | >30 days | >30 days |
| | | n = 2 | >30 days | >30 days | >30 days |
| Comparative Example 3 | Double-Coated Pressure-Sensitive Adhesive Tape 5 | n = 1 | >30 days | >30 days | >30 days |
| | | n = 2 | >30 days | >30 days | >30 days |

Note)
>30 days: held for 30 days or more.

As seen from the measurement results in Tables 8 and 9, when attached to an adherend composed of a general material, such as plate, acrylic sheet and stainless steel sheet, there was no change in the shear holding power. Also, the adhesive strength of the double-coated pressure-sensitive adhesive tape of the present invention was not so inferior to that of conventional ones.

Preparation Example 9

Preparation of Acrylic Copolymer

As shown in Table 10 below, 34.5 parts of isooctyl acrylate, 35 parts of butyl acrylate, 40 parts (solid content: 20 parts) of 50 wt % solution of methacrylate-terminated polystyrene/cyclohexane, 10 parts of 1-vinylimidazole, 0.5 parts of acrylic acid and 165.7 parts of ethyl acetate were charged into a pressure glass bottle. Subsequently, 0.15 parts of 2,2'-azobis(2,4-dimethylvaleronitrile) was charged as a polymerization initiator and from the inert gas inlet tube fixed to the glass bottle, nitrogen gas was introduced over 10 minutes, thereby purging the system with nitrogen gas. Immediately after the nitrogen gas purging, the glass bottle was closed with a cover and in a constant temperature water bath at 50° C., the polymerization was allowed to proceed over 20 hours. From the obtained acrylic copolymer solution, the intrinsic viscosity of the acrylic copolymer was measured and found to be 1.08 dl/g.

Preparation Example 10

Preparation of Acrylic Copolymer

The procedure of Preparation Example 9 was repeated but in this example, the starting materials were changed as shown in Table 10. From the obtained acrylic copolymer solution, the intrinsic viscosity of the acrylic copolymer was measured and found to be 1.22 dl/g.

Preparation Example 11

Preparation of Acrylic Copolymer

The procedure of Preparation Example 9 was repeated but in this example, the starting materials were changed as shown in Table 10. From the obtained acrylic copolymer solution, the intrinsic viscosity of the acrylic copolymer was measured and found to be 1.07 dl/g.

TABLE 10

| Preparation Example | Monomer Mixture (part) | Initiator (part) | Solvent (part) |
|---|---|---|---|
| 9 | IOA/BA/StyM/Vim/AA (34.5/35/20/10/0.5) | ADVN (0.15) | ethyl acetate (165.7) |
| 10 | BA/StyM/Vim/AA (69.5/20/10/0.5) | ADVN (0.15) | ethyl acetate (165.7) |
| 11 | IOA/StyM/Vim/AA (69.5/20/10/0.5) | ADVN (0.1) | ethyl acetate (165.7) |

Preparation Example 12

Preparation of Resin Composition Mainly Comprising Styrene-Based Block Copolymer 12.990 Parts of Finaprene™ 411, 9.098 parts of Finaprene™ 1205, 3.900 parts of NipolBR1220SG, 25.988 parts of Piccolyte™ A-135, 0.520 parts of Irganox™ 1330 and 97.500 parts of toluene were charged into a glass bottle and stirred at room temperature overnight. A syrup-like solution of a resin composition mainly comprising a styrene-based block copolymer was obtained.

Preparation Example 13

Preparation of Resin Composition Mainly Comprising Styrene-Based Block Copolymer 13.000 Parts of Finaprene™ 411, 13.000 parts of Finaprene™ 1205, 25.980 parts of Piccolyte™ A-135, 1.313 parts of Shellflex™ 371N, 0.520 parts of Irganox™ 1330 and 97.500 parts of toluene were charged into a glass bottle and stirred at room temperature overnight. A syrup-like solution of a resin composition mainly comprising a styrene-based block copolymer was obtained.

Example 3

Production of Pressure-Sensitive Adhesive Sheet

Pressure-Sensitive Adhesive Sheet 1:
As shown in Table 11 below, the syrup-like resin composition solution (solid content: 80 parts) obtained in Preparation Example 13 and an aziridine-based crosslinking agent (isophthaloylbis-2-methylaziridine; solid content: 0.1 part) were mixed with the acrylic resin composition solution (solid content: 20 parts) obtained in Preparation Example 10 to prepare a pressure-sensitive adhesive solution. The obtained pressure-sensitive adhesive solution was coated on a release paper (silicone-coated PET film) by a knife coater and dried in an oven at 100° C. for 20 minutes. As a result, Pressure- Sensitive Adhesive Sheet 8 with release paper, where the thickness of the pressure-sensitive adhesive layer was 70 µm, was obtained.

Production of Double-Coated Pressure-Sensitive Adhesive Tape

In this example, a double-coated pressure-sensitive adhesive tape having a layer structure schematically shown in FIG. 4 was produced. That is, as shown in Table 12 below, in the obtained double-coated pressure-sensitive adhesive tape 10, each of the pressure-sensitive adhesive layer 2a and the pressure-sensitive adhesive layer 2b applied to one surface of the substrate 1 was derived from the pressure-sensitive adhesive layer of Pressure-Sensitive Adhesive Sheet 8.

First, for producing a substrate, a 800 µm-thick foamed polymer film (Volara™ 6EO, produced by Sekisui America Corporation) as a core layer and a 50 µm-thick solid polymer film (XMAX™ 161.1, produced by Consolidated Thermoplastics Co.) as a surface layer were prepared. The solid polymer film was laminated on both surfaces of the foamed polymer film and melt-bonded under heat.

After producing the substrate as above, a corona discharge treatment was applied to both surfaces thereof and further, a primer was coated. The primer used here was reaction-type synthetic resin-based polymer "K-500" (trade name, produced by 3M Company). After the primer treatment, Pressure-Sensitive Adhesive Sheet 8 was attached to one surface of the substrate to form a pressure-sensitive adhesive layer 2a with release paper 3a and similarly Pressure-Sensitive Adhesive Sheet 8 was attached to the opposite surface of the substrate to form a pressure-sensitive adhesive layer 2b with release paper 3b (see FIG. 4).

The resulting double-coated pressure-sensitive adhesive tape was cut into a width of 15 mm and a length of 65 mm and the pressure-sensitive adhesive layer in the portion over a length of 15 mm at the end part was removed to form a tab. As a result, a double-coated pressure-sensitive adhesive tape having a layer structure shown in FIG. 4 was obtained. The pressure-sensitive adhesive tape of this example is called "Double-Coated Pressure-Sensitive Adhesive Tape 8" for distinguishing it from pressure-sensitive adhesive tapes produced in other examples.

Evaluation Tests

1. Shear Holding Power Test

The Shear Holding Power Tests 1 and 2 were carried out in accordance with the following methods.

Shear Holding Power Test 1:

A 2.0 mm-thick soft vinyl chloride resin sheet ("XP-103", trade name, produced by Mitsubishi Chemical Corporation) was prepared as the adherend and was lined to a back surface of a stainless steel sheet by an adhesive. Separately, Double-Coated Pressure-Sensitive Adhesive Sheet 8 prepared above was intactly used as a test sample with a width of 15 mm and a length of 65 mm.

A shear holding power test of this test sample was performed as follows.

The pressure-sensitive adhesive layer (pressure-sensitive adhesive layer of Pressure-Sensitive Adhesive Sheet 8, see pressure-sensitive adhesive layer 2b in FIG. 4) of the test sample was attached to the adherend lined to a stainless steel sheet by an adhesive. Another pressure-sensitive adhesive layer (pressure-sensitive adhesive layer of Pressure-Sensitive Adhesive Sheet 8, see pressure-sensitive adhesive layer 2a in FIG. 4) of the test sample was attached with a polystyrene sheet of 16 mm (width)×50 mm (length) after removing the release paper from the layer surface.

Subsequently, in an atmosphere of room temperature (23° C.), a load of 5 kg was applied to the test sample over 30 seconds to press-bond the test sample to the adherend. Thereafter, curing was performed in an oven at 40° C. for 1 hour.

After the completion of curing, a load of 1.0 kg was hung in the lengthwise direction of polystyrene sheet in the oven at 40° C. The time period where the double-coated pressure-sensitive adhesive tape could hold the adherend was measured. The measurement results obtained are shown in Table 13 below.

Shear Holding Power Test 2:

A 2 mm-thick soft vinyl chloride-made wall paper ("TC-2063", trade name, produced by Tesco Company) having notable irregularities or convexes and concaves in the surface was prepared as the adherend and was lined to a stainless steel sheet by an adhesive. Separately, Double-Coated Pressure-Sensitive Adhesive Sheet 8 prepared above was intactly used as a test sample with a width of 15 mm and a length of 65 mm.

A shear holding power test of this test sample was performed as follows.

The pressure-sensitive adhesive layer (pressure-sensitive adhesive layer of Pressure-Sensitive Adhesive Sheet 8, see pressure-sensitive adhesive layer 2b in FIG. 4) of the test sample was attached to the adherend lined to a stainless steel sheet by an adhesive. Another pressure-sensitive adhesive layer (pressure-sensitive adhesive layer of Pressure-Sensitive Adhesive Sheet 8, see pressure-sensitive adhesive layer 2a in FIG. 4) of the test sample was attached with a polystyrene sheet of 16 mm (width)×50 mm (length) after removing the release paper from the layer surface.

Subsequently, in an atmosphere of room temperature (23° C.), a load of 10 kg was applied to the test sample over 30 seconds to press-bond the test sample to the adherend. Thereafter, curing was performed in an oven at 40° C. for 1 hour.

After the completion of curing, a load of 3.0 kg was hung in the lengthwise direction of polystyrene sheet in the oven at 40° C. The time period where the double-coated pressure-sensitive adhesive tape could hold each adherend was measured. The measurement results obtained are shown in Table 13 below.

2. 90° Peel Test (Adhesive Strength Test)

A 2.0 mm-thick soft vinyl chloride resin sheet ("XP-103", trade name, produced by Mitsubishi Chemical Corporation) was prepared as the adherend and lined to a stainless steel sheet by an adhesive. Separately, Pressure-Sensitive Adhesive Sheet 8 prepared above was attached to a 50 µm-thick PET film to produce a test sample with a width of 15 mm and a length of 65 mm.

A 90° peel test of this test sample was performed as follows.

The test sample was attached to the adherend lined to a stainless steel sheet by an adhesive. In an atmosphere of room temperature (23° C.), a rubber roller of 2 kg was reciprocated once on the test sample to press-bond the test sample to the adherend. Thereafter, curing was performed under the following different conditions:

1) at 23° C. for 24 hours,
2) at 65° C. for 12 hours, and
3) at 65° C. for 3 days.

After the completion of curing, each test sample was separated from the adherend by pulling it at a measuring temperature of 23° C., a peel angle of 90° and a pulling rate of 300 mm/min. The force (adhesive strength) required for separation was measured. The measurement results obtained are shown in Table 14 below.

3. Stretch-Release Test

As shown in FIG. 5, a 2 mm-thick soft vinyl chloride-made wall paper ("TC-2063", trade name, produced by Tesco Company) having notable irregularities in the surface and a 2 mm-thick soft vinyl chloride-made wall paper ("TC-2399", trade name, produced by Tesco Company) were prepared as the adherend 52 and each was lined to a stainless steel sheet 51 by an adhesive. Separately, Double-Coated Pressure-Sensitive Adhesive Sheet 8 (reference numeral 10 in FIG. 5) prepared above was intactly used as a test sample with a width of 15 mm and a length of 65 mm.

A stretch-release test of this test sample was performed as schematically shown in FIG. 5.

After fixing the adherend 52 in a tester, the pressure-sensitive adhesive layer (pressure-sensitive adhesive layer of Pressure-Sensitive Adhesive Sheet 8, see pressure-sensitive adhesive layer 2b in FIG. 5) of the test sample was attached to the adherend. In an atmosphere of room temperature (23° C.), a stainless steel-made roller of 10 kg was reciprocated once on the test sample to press-bond the test sample to the adherend.

Subsequently, another pressure-sensitive adhesive layer (pressure-sensitive adhesive layer of Pressure-Sensitive Adhesive Sheet 8, see pressure-sensitive adhesive layer 2a in FIG. 5) of the test sample was attached with a polystyrene sheet of 16 mm (width)×50 mm (length) after removing the release paper from the layer surface. Thereafter, curing was performed at 23° C. for 7 days.

After the completion of curing, the tab 1a of the test sample was nipped and pulled in the 2° direction. The peel strength was measured along with observation of the releasability. The test results obtained are shown in Table 14 below.

Example 4

A pressure-sensitive adhesive sheet and a double-coated pressure-sensitive adhesive tape (this is called "Double-Coated Pressure-Sensitive Adhesive Tape 9") were produced according to the method described in Example 3. In this example, Pressure-Sensitive Adhesive Sheet 9 was produced from the pressure-sensitive adhesive solution shown in Table 11 below and then Double-Coated Pressure-Sensitive Adhesive Tape 9 having a layer structure shown in Table 12 below was produced.

From Double-Coated Pressure-Sensitive Adhesive Tape 9 obtained, a test sample was produced and in accordance with the procedures described in Example 3, shear holding power tests 1 and 2, a 90° peel test and a stretch-release test were performed. The test results obtained are shown in Tables 13 and 14 below.

Example 5

A pressure-sensitive adhesive sheet and a double-coated pressure-sensitive adhesive tape (this is called "Double-Coated Pressure-Sensitive Adhesive Tape 10") were produced according to the method described in Example 3. In this example, Pressure-Sensitive Adhesive Sheet 10 was produced from the pressure-sensitive adhesive solution shown in Table 11 below and then Double-Coated Pressure-Sensitive Adhesive Tape 10 having a layer structure shown in Table 12 below was produced.

From Double-Coated Pressure-Sensitive Adhesive Tape 10 obtained, a test sample was produced and in accordance with the procedures described in Example 3, shear holding power tests 1 and 2, a 90° peel test and a stretch-release test were performed. The test results obtained are shown in Tables 13 and 14 below.

Example 6

A pressure-sensitive adhesive sheet and a double-coated pressure-sensitive adhesive tape (this is called "Double-Coated Pressure-Sensitive Adhesive Tape 11") were produced according to the method described in Example 3. In this example, Pressure-Sensitive Adhesive Sheet 11 was produced from the pressure-sensitive adhesive solution shown in Table 11 below and then Double-Coated Pressure-Sensitive Adhesive Tape 11 having a layer structure shown in Table 12 below was produced.

From Double-Coated Pressure-Sensitive Adhesive Tape 11 obtained, a test sample was produced and in accordance with the procedures described in Example 3, shear holding power tests 1 and 2, a 90° peel test and a stretch-release test were performed. The test results obtained are shown in Tables 13 and 14 below

TABLE 11

| No. of Pressure-Sensitive Adhesive Sheet | Blending Ratio (ratio of solid content) |
| --- | --- |
| Pressure-Sensitive Adhesive Sheet 8 | Preparation Example 10/Preparation Example 13/crosslinking agent = 20:80:0.04 |
| Pressure-Sensitive Adhesive Sheet 9 | Preparation Example 11/Preparation Example 13/crosslinking agent = 20:80:0.04 |
| Pressure-Sensitive adhesive sheet 10 | Preparation Example 9/Preparation Example 13/crosslinking agent = 20:80:0.04 |
| Pressure-Sensitive Adhesive Sheet 11 | Preparation Example 9/Preparation Example 12/crosslinking agent = 20:80:0.04 |

Note)
Crosslinking agent: aziridine-based crosslinking agent.

TABLE 12

| Example No. | No. of Double-Coated Pressure-Sensitive Adhesive Tape | Pressure-Sensitive Adhesive Layer (2a) | Pressure-Sensitive Adhesive Layer (2b) |
| --- | --- | --- | --- |
| Example 3 | Double-Coated Pressure-Sensitive Adhesive Tape 8 | Pressure-Sensitive Adhesive Sheet 8 | Pressure-Sensitive Adhesive Sheet 8 |
| Example 4 | Double-Coated Pressure-Sensitive Adhesive Tape 9 | Pressure-Sensitive Adhesive Sheet 9 | Pressure-Sensitive Adhesive Sheet 9 |
| Example 5 | Double-Coated Pressure-Sensitive Adhesive Tape 10 | Pressure-Sensitive Adhesive Sheet 10 | Pressure-Sensitive Adhesive Sheet 10 |
| Example 6 | Double-Coated Pressure-Sensitive Adhesive Tape 11 | Pressure-Sensitive Adhesive Sheet 11 | Pressure-Sensitive Adhesive Sheet 11 |

Note)
Pressure-sensitive adhesive layer: see the double-coated pressure-sensitive adhesive tape of FIG. 4.

TABLE 13

| Example No. | Double-Coated Pressure-Sensitive Tape | Shear Holding Power Test 1 Adherend: Soft Vinyl Chloride Resin (XP-103) | Shear Holding Power Test 2 Adherend: Vinyl Chloride Wall Paper (TC-2063) |
| --- | --- | --- | --- |
| Example 3 | Double-Coated Pressure-Sensitive Tape 8 | held for 30 days or more | fallen after 75 min. |
| Example 4 | Double-Coated Pressure-Sensitive Tape 9 | held for 30 days or more | fallen after 98 min. |
| Example 5 | Double-Coated Pressure-Sensitive Tape 10 | held for 30 days or more | fallen after 2777 min. |

TABLE 13-continued

| Example No. | Double-Coated Pressure-Sensitive Tape | Shear Holding Power Test 1 Adherend: Soft Vinyl Chloride Resin (XP-103) | Shear Holding Power Test 2 Adherend: Vinyl Chloride Wall Paper (TC-2063) |
|---|---|---|---|
| Example 6 | Double-Coated Pressure-Sensitive Tape 11 | held for 30 days or more | fallen after 7808 min. |

As seen from the results in Table 13, each of the double-coated pressure-sensitive adhesive tapes 8 to 11 can be well adhered to both of the soft vinyl chloride resin having a smooth surface and the soft vinyl chloride-made wall paper having an irregular surface. Moreover, the double-coated pressure-sensitive adhesive tapes 10 and 11 can be satisfactory adhered to the wall paper having notable irregularities in the surface, and also can exhibit an excellent retention performance.

TABLE 14

| Example No. (Double-Coated Pressure-Sensitive Adhesive Tape) | 90° Peel Test | | | Shear Holding Power Test | | | |
|---|---|---|---|---|---|---|---|
| | Adhesive Strength After 24 Hours at 23° C. (N/15 mm) | Adhesive Strength After 12 Hours at 65° C. (N/15 mm) | Adhesive Strength After 3 Days at 65° C. (N/15 mm) | Adherend: Soft Vinyl Chloride Resin (TC-2063) | | Adherend: Vinyl Chloride Wall Paper (TC-2399) | |
| | | | | Peel Strength (N/15 mm) | Releasability | Peel Strength (N/15 mm) | Releasability |
| Example 3 (Tape 8) | 21.1 | 18.4 | 10.6 | 18.0 | Good | 22.5 | Good |
| Example 4 (Tape 9) | 18.7 | 15.7 | 4.5 | 18.0 | Good | 23.5 | Good |
| Example 5 (Tape 10) | 28.6 | 18.1 | 9.6 | 18.0 | Good | 23.0 | Good |
| Example 6 (Tape 11) | 29.1 | 22.0 | 9.2 | 20.0 | Good | 27.5 | Good |

Note)
Releasability: Good . . . No residue of adhesive, No damage of wall paper

As seen from the results in Tables 13 and 14, especially the double-coated pressure-sensitive adhesive tapes 10 and 11 are an excellent rereleasable pressure-sensitive adhesive tape which can exhibit a balance of the adhesive strength verified in the 900 peel test and shear holding power tests 1 and 2 and the cohesive strength required for the shear holding power tests 1 and 2 and stretch-release test.

We claim:

1. A pressure-sensitive adhesive tape comprising a stretchable substrate and a pressure-sensitive adhesive layer provided on at least one surface of said substrate, said pressure-sensitive adhesive layer comprising a pressure-sensitive adhesive composition comprising a cohesive component and a basic component, wherein the mixing ratio of the cohesive component to the basic component is from about 5:95 to about 95:5, the cohesive component comprising a styrene-based block copolymer selected from the group consisting of styrene-butadiene block copolymer, styrene-butadiene-styrene block copolymer, styrene-ethylene-propylene block copolymer, styrene-isoprene block copolymer, and styrene-ethylene-butadiene block copolymer, and the basic component comprising a polymer formed from monomers consisting of an alkyl(meth)acrylate, a nitrogen-containing vinyl monomer, and a monomer grafted with a polystyrene;

said pressure sensitive adhesive tape being adapted to be removed from an adherend by pulling the tape at an angle of about 35° or less from the adherend surface while leaving substantially no pressure-sensitive adhesive residue after release.

2. The pressure-sensitive adhesive tape as defined in claim 1, wherein said alkyl(meth)acrylate comprises isooctyl (meth)acrylate, butyl(meth)acrylate, ethyl(meth)acrylate, or a combination thereof.

3. The pressure-sensitive adhesive tape as defined in claim 1, wherein the cohesive component further comprises an elastomer containing a conjugate double bond.

4. The pressure-sensitive adhesive tape as defined in claim 3, wherein said elastomer has an average molecular weight of 1,000 to 2,000,000.

5. The pressure-sensitive adhesive tape as defined in claim 4, wherein said elastomer comprises polybutadiene, polyisoprene, or a combination thereof.

6. The pressure-sensitive adhesive tape as defined in claim 1, wherein said grafted polystyrene has a glass transition point of 20 to 250° C. and a weight average molecular weight of 2,000 to 500,000 as measured by gel permeation chromatography.

7. The pressure-sensitive adhesive composition tape of claim 1 wherein the mixing ratio of the cohesive component to the basic component is from about 25:75 to about 90:10.

8. The pressure-sensitive adhesive tape as defined in claim 1, wherein said substrate comprises a single-layer or multi-layer highly extensible polymer material such that when the substrate is stretched in the lengthwise direction, an elongation of at least about 150% is generated based on the original length.

9. The pressure-sensitive adhesive tape as defined in claim 8, wherein said highly extensible polymer material is at least one polymer film selected from the group consisting of the following polymer films:

(1) a polymer film having a lengthwise elongation at break of 50 to 1,200%, an elastic recovery of less than 50% after stretching, and a Young's modulus of 6,894.7 to 499,865.8 KPa, (2) a foamed polymer film,
(3) a polymer film having a stress of 20 N/15 mm or less at the yield point or proportional limit point, a tensile rupture strength of 30 N/15 mm or more and an elongation at break of 150% or more, and
(4) a polymer film comprising a thermoplastic rubber and an adhesive-forming resin.

10. The pressure-sensitive adhesive tape as defined in claim 9, wherein said substrate is a composition of a foamed polymer film and a foaming-free polymer film.

11. The pressure-sensitive adhesive tape as defined in claim 10, wherein said pressure-sensitive adhesive layer has a thickness of 10 to 1,000 μm.

12. An adhesion structure comprising a pressure-sensitive adhesive tape described in claim 11 and an adherend having attached thereto said pressure-sensitive adhesive tape through said pressure-sensitive adhesive layer.

13. The adhesion structure as defined in claim 12, wherein said adherend is formed of a vinyl chloride resin containing a plasticizer.

\* \* \* \* \*